United States Patent
Hafemann

(10) Patent No.: US 10,380,579 B1
(45) Date of Patent: Aug. 13, 2019

(54) INTEGRATION OF TRANSACTION STATUS INDICATIONS

(71) Applicant: Square, Inc., San Francisco, CA (US)

(72) Inventor: Sean Michael Hafemann, Lafayette, CA (US)

(73) Assignee: Square, Inc., San Francisco, CA (US)

( * ) Notice: Subject to any disclaimer, the term of this patent is extended or adjusted under 35 U.S.C. 154(b) by 106 days.

(21) Appl. No.: 15/389,022

(22) Filed: Dec. 22, 2016

(51) Int. Cl.
*H04L 9/08* (2006.01)
*G06Q 20/10* (2012.01)
*G06Q 20/20* (2012.01)
*G06Q 20/32* (2012.01)
*G06Q 20/40* (2012.01)
*G08B 21/18* (2006.01)
*H04N 21/4227* (2011.01)

(52) U.S. Cl.
CPC ....... *G06Q 20/3278* (2013.01); *G06Q 20/102* (2013.01); *G06Q 20/202* (2013.01); *G06Q 20/325* (2013.01); *G06Q 20/40* (2013.01); *G08B 21/18* (2013.01); *H04L 9/08* (2013.01); *H04N 21/4227* (2013.01)

(58) Field of Classification Search
CPC ............. G06Q 20/3278; G06Q 20/102; G06Q 20/202; G06Q 20/325; G06Q 20/40; G08B 21/18
USPC ...................................... 705/16, 18
See application file for complete search history.

(56) References Cited

U.S. PATENT DOCUMENTS 6,507,352 B1  1/2003  Cohen et al.
7,464,334 B2  12/2008  Miller et al.
(Continued)

FOREIGN PATENT DOCUMENTS

EP  2 590 391 A2  5/2013
JP  H10-011660 A  1/1998
(Continued)

OTHER PUBLICATIONS

Evans, S.D., "[Python] rotate( ) in Tkinter—Grokbase," grokbase.com, dated Dec. 6, 2000, Retrieved from Internet URL: http://grokbase.com/t/python/python-list/00c6q9dgz1/rotate-in-tkinter, on Jan. 7, 2015, pp. 1-2.
(Continued)

*Primary Examiner* — Florian M Zeender
*Assistant Examiner* — Nicole Elena Bruner
(74) *Attorney, Agent, or Firm* — Lee & Hayes, P.C.

(57) ABSTRACT

Facilitating transaction status indications for point-of-sale (POS) systems is described. A POS application stored on a POS terminal of a POS system may communicate with a payment reader device coupled to the POS terminal and a payment server application. The POS application may receive, from a customer device associated with a customer and via a short-range communication network, payment information for satisfying a cost of a transaction. The POS application may send the payment information to the payment server application to attempt to authorize the payment information for the cost of the transaction and may receive, from the payment server application, an indication of a status of the transaction. Responsive to receiving the indication of the status of the transaction, the payment reader device and the customer device may output respective aspects of a transaction status indication associated with the status of the transaction.

20 Claims, 7 Drawing Sheets

(56) References Cited

U.S. PATENT DOCUMENTS

| | | | |
|---|---|---|---|
| 7,689,409 B2 | 3/2010 | Heinecke | |
| 8,078,507 B1 | 12/2011 | Rao et al. | |
| 8,542,195 B2 | 9/2013 | Bi et al. | |
| 8,701,004 B2 | 4/2014 | Hoerentrup et al. | |
| 8,944,322 B2 | 2/2015 | White | |
| 8,985,442 B1* | 3/2015 | Zhou | G06Q 20/30 235/375 |
| 9,105,026 B1 | 8/2015 | Edwards | |
| 9,129,274 B1 | 9/2015 | Mocko et al. | |
| 9,164,982 B1 | 10/2015 | Kaeser | |
| 9,170,826 B2 | 10/2015 | Brunswig et al. | |
| 9,262,407 B1 | 2/2016 | Ermann et al. | |
| 9,304,664 B2 | 4/2016 | Hoerentrup et al. | |
| 9,324,065 B2 | 4/2016 | Mocko et al. | |
| 9,368,021 B2* | 6/2016 | Touloumtzis | H04L 67/24 |
| 9,418,139 B2 | 8/2016 | Moulinier et al. | |
| 9,582,570 B2 | 2/2017 | Zheng et al. | |
| 9,699,610 B1* | 7/2017 | Chicoine | H04W 4/023 |
| 9,881,287 B1 | 1/2018 | Edwards | |
| 2002/0133523 A1 | 9/2002 | Ambler et al. | |
| 2002/0153414 A1 | 10/2002 | Stoutenburg et al. | |
| 2002/0156683 A1 | 10/2002 | Stoutenburg et al. | |
| 2002/0180868 A1 | 12/2002 | Lippert et al. | |
| 2003/0009694 A1 | 1/2003 | Wenocur et al. | |
| 2003/0046526 A1 | 3/2003 | Zhang et al. | |
| 2003/0132298 A1 | 7/2003 | Swartz et al. | |
| 2003/0144922 A1 | 7/2003 | Schrantz | |
| 2004/0102244 A1 | 5/2004 | Kryuchkov et al. | |
| 2004/0172236 A1 | 9/2004 | Fraser | |
| 2005/0204332 A1 | 9/2005 | Krishnan et al. | |
| 2006/0020469 A1 | 1/2006 | Rast | |
| 2006/0072136 A1 | 4/2006 | Hodder et al. | |
| 2006/0136220 A1 | 6/2006 | Gurram et al. | |
| 2006/0210026 A1 | 9/2006 | Duplessis et al. | |
| 2006/0224438 A1 | 10/2006 | Obuchi et al. | |
| 2006/0230267 A1 | 10/2006 | Mathew et al. | |
| 2007/0017971 A1 | 1/2007 | Im | |
| 2007/0174140 A1 | 7/2007 | Noonan et al. | |
| 2007/0230787 A1 | 10/2007 | Belitskaya et al. | |
| 2007/0288450 A1 | 12/2007 | Datta et al. | |
| 2008/0027815 A1* | 1/2008 | Johnson | G06Q 20/204 705/17 |
| 2008/0048880 A1 | 2/2008 | Strickland et al. | |
| 2008/0121690 A1 | 5/2008 | Carani et al. | |
| 2008/0122656 A1 | 5/2008 | Carani et al. | |
| 2008/0136658 A1 | 6/2008 | Brask | |
| 2009/0005072 A1 | 1/2009 | Forstall et al. | |
| 2009/0077464 A1 | 3/2009 | Goldsmith et al. | |
| 2009/0119092 A1 | 5/2009 | Balasubramanyan et al. | |
| 2009/0144650 A1 | 6/2009 | Yoon | |
| 2009/0259778 A1 | 10/2009 | Burge | |
| 2010/0007603 A1 | 1/2010 | Kirkup | |
| 2010/0057620 A1 | 3/2010 | Li et al. | |
| 2010/0073336 A1 | 3/2010 | Lee et al. | |
| 2010/0081475 A1 | 4/2010 | Chiang et al. | |
| 2010/0088632 A1 | 4/2010 | Knowles et al. | |
| 2010/0121764 A1* | 5/2010 | Niedermeyer | G06Q 20/28 705/44 |
| 2010/0156939 A1 | 6/2010 | Lee | |
| 2010/0159996 A1 | 6/2010 | Rider et al. | |
| 2010/0182135 A1 | 7/2010 | Moosavi | |
| 2010/0197352 A1 | 8/2010 | Runstedler et al. | |
| 2011/0087990 A1 | 4/2011 | Ng et al. | |
| 2011/0090147 A1 | 4/2011 | Gervais et al. | |
| 2011/0220712 A1 | 9/2011 | Nakaeda | |
| 2012/0010886 A1 | 1/2012 | Razavilar | |
| 2012/0029691 A1 | 2/2012 | Mockus et al. | |
| 2012/0050198 A1 | 3/2012 | Cannon | |
| 2012/0078741 A1 | 3/2012 | DeLine | |
| 2012/0081277 A1 | 4/2012 | de Paz | |
| 2012/0088544 A1 | 4/2012 | Bentley et al. | |
| 2012/0095821 A1 | 4/2012 | Fuquen et al. | |
| 2012/0151415 A1 | 6/2012 | Park et al. | |
| 2012/0154293 A1 | 6/2012 | Hinckley et al. | |
| 2012/0197740 A1* | 8/2012 | Grigg | G06Q 20/20 705/16 |
| 2012/0215648 A1 | 8/2012 | Rose et al. | |
| 2012/0256959 A1 | 10/2012 | Ye et al. | |
| 2012/0260218 A1 | 10/2012 | Bawel | |
| 2012/0290287 A1 | 11/2012 | Fux et al. | |
| 2012/0290435 A1 | 11/2012 | Trotman et al. | |
| 2013/0124417 A1* | 5/2013 | Spears | G06Q 20/40 705/44 |
| 2013/0132091 A1 | 5/2013 | Skerpac | |
| 2013/0226800 A1 | 8/2013 | Patel et al. | |
| 2014/0002407 A1 | 1/2014 | Badaye et al. | |
| 2014/0012689 A1* | 1/2014 | Henderson | G06Q 20/3224 705/18 |
| 2014/0028541 A1 | 1/2014 | Truong et al. | |
| 2014/0039872 A1 | 2/2014 | Patel | |
| 2014/0075286 A1 | 3/2014 | Harada | |
| 2014/0136443 A1* | 5/2014 | Kinsey, II | G06Q 10/063116 705/347 |
| 2014/0152507 A1 | 6/2014 | McAllister | |
| 2014/0236568 A1 | 8/2014 | Satpute | |
| 2015/0001291 A1 | 1/2015 | Govindarajan et al. | |
| 2015/0025967 A1 | 1/2015 | Ellison | |
| 2015/0194024 A1 | 7/2015 | Govindarajan et al. | |
| 2015/0199882 A1 | 7/2015 | Fernando et al. | |
| 2015/0206128 A1 | 7/2015 | Torossian et al. | |
| 2015/0220217 A1 | 8/2015 | Alshafai | |
| 2016/0051067 A1 | 2/2016 | Law et al. | |
| 2016/0124627 A1 | 5/2016 | Beatty et al. | |
| 2016/0125449 A1 | 5/2016 | Beatty et al. | |
| 2016/0148182 A1 | 5/2016 | Craine et al. | |
| 2017/0011367 A1* | 1/2017 | Agrawal | G06Q 20/10 |
| 2017/0091765 A1* | 3/2017 | Lloyd | G06Q 20/32 |
| 2017/0185983 A1 | 6/2017 | Renke | |
| 2017/0262892 A1 | 9/2017 | Fernando et al. | |
| 2018/0056179 A1 | 3/2018 | Rose et al. | |
| 2018/0150815 A1 | 5/2018 | Mocko et al. | |

FOREIGN PATENT DOCUMENTS

| | | |
|---|---|---|
| JP | 2001-118147 A | 4/2001 |
| JP | 2001-256559 A | 9/2001 |
| JP | 2003-272047 A | 9/2003 |
| JP | 2009-503652 A | 1/2009 |
| JP | 2012-178011 A | 9/2012 |
| JP | 2013-041460 A | 2/2013 |
| WO | 2013/055758 A1 | 4/2013 |
| WO | 2015/191468 A1 | 12/2015 |
| WO | 2017/117145 A1 | 7/2017 |

OTHER PUBLICATIONS

Non Final Office Action dated Feb. 13, 2015, for U.S. Appl. No. 14/042,525, of Edwards, T.J., filed Sep. 30, 2013.
Notice of Allowance dated May 5, 2015, U.S. Appl. No. 14/301,621, of Mocko, C.L., et al., filed Jun. 11, 2014.
Notice of Allowance dated May 11, 2015, for U.S. Appl. No. 14/042,525, of Edwards, T.J., filed Sep. 30, 2013.
Non Final Office Action dated Sep. 9, 2015, for U.S. Appl. No. 14/301,603, of Mocko, C.L., et al., filed Jun. 11, 2014.
Notice of Allowance dated Dec. 21, 2015, for U.S. Appl. No. 14/301,603, of Mocko, C.L., et al., filed Jun. 11, 2014.
Notice of Acceptance for Australian Patent Application No. 2015274903, dated Feb. 22, 2017.
Examination Report No. 1 for Australian Patent Application No. 2017202569, dated Apr. 28, 2017.
Non-Final Office Action dated May 25, 2017, for U.S. Appl. No. 14/749,980, of Edwards, T.J., filed Jun. 25, 2015.
Notice of Allowance dated Sep. 12, 2017, for U.S. Appl. No. 14/749,980, of Edwards, T.J., filed Jun. 25, 2015.
English-language translation of Notification of Reasons for Refusal for Japanese Patent Application No. 2017-517195, dated Jan. 4, 2018.
Non-Final Office Action dated Apr. 23, 2018, for U.S. Appl. No. 15/011,806, of Mocko, C.L., et al., filed Feb. 1, 2016.

(56) References Cited

OTHER PUBLICATIONS

Examination Report No. 2 for Australian Patent Application No. 2017202569, dated Apr. 26, 2018.
English-language translation of Decision to Grant for Japanese Patent Application No. 2017-517195, dated Jul. 2, 2018.
Final Office Action dated Aug. 31, 2018, for U.S. Appl. No. 15/011,806, of Mocko, C.L., et al., filed Feb. 1, 2016.
Office Action for European Patent Application No. 15807035.9, dated Oct. 17, 2018.
Non-Final Office Action dated Oct. 18, 2018, for U.S. Appl. No. 14/982,994, of Renke, C.P., filed Dec. 29, 2015.
Advisory Action dated Dec. 13, 2018, for U.S. Appl. No. 15/011,806, of Mocko, C.L., et al., filed Feb. 1, 2016.
Office Action for European Patent Application No. 16826626.0, dated Jan. 4, 2019.
Notice of Allowance dated Jan. 22, 2019, for U.S. Appl. No. 15/011,806, of Mocko, C.L., et al., filed Feb. 1, 2016.
International Search Report and Written Opinion for International Application No. PCT/US2015/034727, dated Sep. 3, 2015.
International Search Report and Written Opinion for International Patent Application No. PCT/US2016/068748, dated Feb. 16, 2017.
Extended European Search Report for European Patent Application No. 15807035.9, dated Dec. 13, 2017.
Final Office Action dated Feb. 21, 2019, for U.S. Appl. No. 141982,994, of Renke, C.P. et al. filed Dec. 29, 2015.

* cited by examiner

500

```
┌─────────────────────────────────────────────────────────────────────────┐
│ RECEIVE, FROM A POINT-OF-SALE (POS) SYSTEM, TRANSACTION DATA ASSOCIATED │
│              WITH A TRANSACTION BETWEEN A CUSTOMER AND A MERCHANT        │
│                                    502                                   │
└─────────────────────────────────────────────────────────────────────────┘
                                     ↓
┌─────────────────────────────────────────────────────────────────────────┐
│  SEND, TO A BANKING SERVER, A REQUEST TO AUTHORIZE PAYMENT DATA ASSOCIATED │
│           WITH THE TRANSACTION DATA FOR A COST OF THE TRANSACTION         │
│                                    504                                   │
└─────────────────────────────────────────────────────────────────────────┘
                                     ↓
┌─────────────────────────────────────────────────────────────────────────┐
│       RECEIVE, FROM THE BANKING SERVER, A RESPONSE INDICATING A STATUS    │
│                             OF THE TRANSACTION                            │
│                                    506                                   │
└─────────────────────────────────────────────────────────────────────────┘
                                     ↓
┌─────────────────────────────────────────────────────────────────────────┐
│        DETERMINE A TRANSACTION STATUS INDICATION CORRESPONDING TO THE     │
│                                   STATUS                                  │
│                                    508                                   │
└─────────────────────────────────────────────────────────────────────────┘
                                     ↓
┌─────────────────────────────────────────────────────────────────────────┐
│    SEND INSTRUCTIONS ASSOCIATED WITH THE TRANSACTION STATUS INDICATION    │
│       TO A POS APPLICATION EXECUTING ON A POS TERMINAL OF THE POS SYSTEM  │
│                                    510                                   │
└─────────────────────────────────────────────────────────────────────────┘
```

FIG. 5

INTEGRATION OF TRANSACTION STATUS INDICATIONS

BACKGROUND

Contactless payment systems facilitate secure payments using short-range communication networks (e.g., near field communication (NFC), radio-frequency identification (RFID), etc.). For instance, contactless payment systems facilitate the exchange of transaction information between a payment instrument (e.g., an EMV payment card, a mobile device executing a payment application, etc.) and a payment terminal over a short-range communication network when the payment instrument and the payment terminal are within a threshold distance of one another. In an example where a customer uses a mobile device as a payment instrument, to alert a customer associated with the payment instrument of a successful transaction, the mobile phone or the payment terminal may provide an indication to the customer. For instance, with APPLE PAY®, a customer's mobile phone may vibrate or beep to confirm that the customer paid correctly. Or, with other payment systems, the payment terminal may output an audible success tone (e.g., a sound generated by a 1500 Hz sine wave for a period of approximately 500 milliseconds) or an audible alert tone (e.g., a double beep generated by a 750 Hz sine wave for a first period of approximately 200 milliseconds and a second period of approximately 200 milliseconds, with approximately 200 milliseconds between the first period and the second period) to provide an indication to the customer regarding the contactless payment.

BRIEF DESCRIPTION OF THE DRAWINGS

The above and other features of the present disclosure, its nature and various advantages, will be more apparent upon consideration of the following detailed description, taken in conjunction with the accompanying drawings in which:

FIG. 5 depicts a non-limiting flow diagram illustrating a method for determining a transaction status indication corresponding to a status of a transaction and sending the transaction status indication to a POS system for presentation of respective aspects of the transaction status indication via a payment reader device of the POS system and a customer device;

Figure 1:
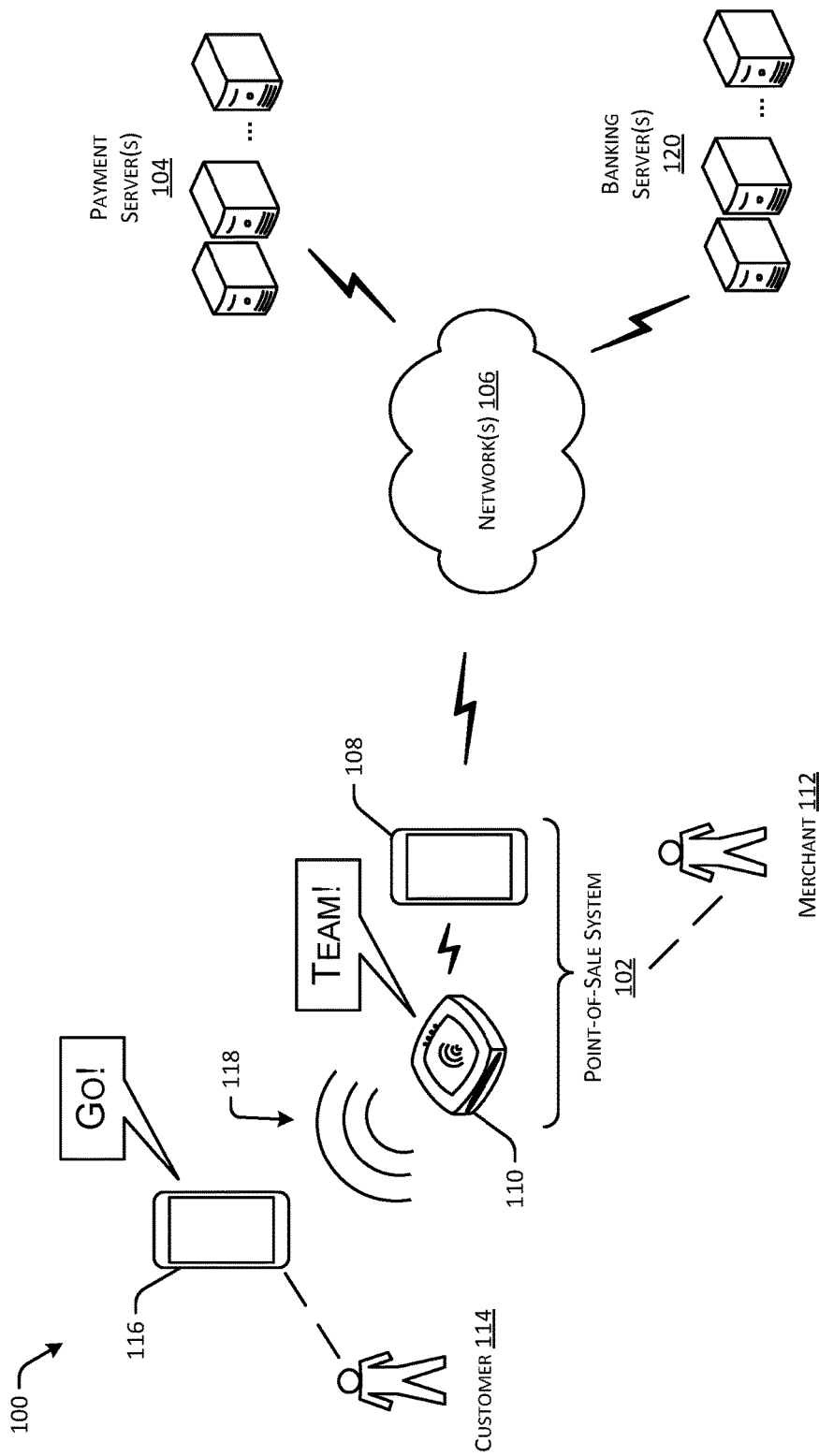
FIG. 1 depicts an illustrative block diagram of a payment system in accordance with some examples of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

A point-of-sale (POS) system may include a POS terminal and a payment reader device. The payment reader device may physically interact with payment instruments such as magnetic stripe payment cards, EMV payment cards, and/or short-range communication (e.g., Bluetooth®, Bluetooth® low energy (BLE), near-field communication (NFC), radio-frequency identification (RFID), etc.) payment instruments. The POS terminal may provide a rich user interface, communicate with the payment reader device, and communicate with a payment server. In this manner, the POS terminal and payment reader device may collectively process transaction(s) between a merchant and customer(s).

In an example, short-range communication payment instruments may include an electronic device (e.g., a mobile device, etc.) executing a payment application thereon. In such an example, the payment application may exchange data with a payment reader device of a POS system via a short-range communication network to facilitate a transaction between a customer associated with the electronic device and a merchant associated with the POS system. That is, when the electronic device executing the payment application thereon is within a threshold distance of the payment reader device, payment data may be passed from the payment application to the payment reader device via a short-range communication network. The payment reader device may provide the payment data to a POS terminal associated with the POS system, which may provide the payment data to a payment server for processing the payment data and attempting to authorize the transaction based on the payment data.

Techniques described herein are directed to facilitating transaction status indications. In at least one example, techniques described herein are directed to facilitating transaction status indications that are output on both a payment reader device and a device associated with a customer (i.e., a customer device). That is, to alert the customer of a status of a transaction, techniques described herein, are directed to outputting different aspects of a transaction status indication on a payment reader device and on a customer device. For the purpose of this discussion, a transaction status indication is a signal output via two or more devices (e.g., a payment reader device, a customer device, etc.). An aspect of a transaction status indication is the portion of the signal output on one of the devices (e.g., a payment reader device, a customer device, etc.). A transaction status indication may be an audio signal (e.g., a chord, a chime, a song, a sound, a rhythm, etc.), a visual signal (e.g., a flash of a light, a presentation of multiple lights, a graphical presentation, etc.), a combination of an audio signal and a visual signal, etc.

In at least one example, as described herein, different transaction status indications may be output based on various characteristics of a transaction. For instance, transaction status indications may be customized based on merchants, merchant characteristics, transaction characteristics, customer characteristics, device types, events, locations, etc. As a non-limiting example, a coffee shop may customize a transaction status indication that is output when a customer completes a transaction at the coffee shop to sound like liquid (e.g., coffee) pouring out of a container. Accordingly, when a customer uses his or her mobile device to pay for coffee at the coffee shop, the customer may hear liquid pouring out of a container upon authorization of the transaction. In such an example, the payment reader device and the mobile device of the customer may output the sound of liquid pouring out of a carafe or other container synchronously. That is, both the payment reader device and the mobile device may output respective aspects of the transaction status indication (e.g., liquid pouring out of a container) in a time-synchronized manner so as to communicate to the customer that his or her transaction is successful.

As another non-limiting example, a merchant may customize a transaction status indication that is output when a customer spends more than a threshold or predetermined amount (e.g., $1000.00) in a single transaction with the merchant. For instance, the transaction status indication may sound like hands clapping (i.e., applause). Accordingly, when a customer uses his or her mobile device to pay for items (e.g., goods and/or services) offered for acquisition (e.g., for sale, rent, lease, etc.) by the merchant and spends more than $1000, the customer may hear an applause upon authorization of the transaction. In such an example, the payment reader device and the mobile device of the customer may output the sound of applause synchronously. That is, both the payment reader device and the mobile device may output respective aspects of the transaction status indication (e.g., applause) in a time-synchronized manner so as to communicate to the customer that his or her transaction is successful.

The time-synchronized output of aspects of transaction status indications described herein afford various technical improvements. For instance, in at least one example, techniques described herein enable enhanced and/or customized transaction status indications using clock and/or timer synchronization between a payment reader device and a mobile device. That is, as described below, a payment reader device and a mobile device may output aspects of transaction status indications based on receiving signals from timers on the respective devices. The time-synchronized output may afford enhanced and/or customized transaction status indications as described herein.

Although the examples discussed above refer to both the payment reader device and the customer device outputting transaction status indications, it should be noted that in some instances, either of the devices may output a transaction status indication or both devices may output a transaction status indication. That is, in at least one example, either the payment reader device or the customer device may output a transaction status indication or an aspect of a transaction status indication. Furthermore, although the examples discussed above refer to aspects of the transaction status indication being output synchronously, as described herein, aspects of the transaction status indication may be output asynchronously. Additionally, although the examples discussed above refer to aspects of the transaction status indication comprising a same sound, as described herein, aspects of the transaction status indication may be associated with different sounds or same or different visual signals.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 depicts an illustrative block diagram of a payment system 100 in accordance with some examples of the present disclosure. In at least one example, the payment system 100 may include a POS system 102 communicatively coupled to one or more payment servers 104 via one or more networks 106. The POS system 102 may include a POS terminal 108 and a payment reader device 110. The POS system 102 may be associated with a merchant 112. That is, the merchant 112 may utilize the POS system 102 to facilitate electronic payment transactions with customer(s), such as customer 114.

In an example, an electronic payment transaction may result from an interaction between a merchant 112 and a customer 114 that takes place between the customer's payment instrument(s) and the merchant's POS system 102. The customer 114 may have a payment instrument such as a credit card having a magnetic stripe, an EMV chip card, or a short-range communication-enabled electronic device (i.e., customer device 116), such as a smart phone running a payment application. The merchant 112 may have a POS system 102 that is capable of processing payment information (e.g., encrypted payment data and user authentication data) and transaction information (e.g., purchase amount and point-of-purchase information), such as a smart phone or tablet running a payment application that is associated with a payment reader device as described herein. As illustrated in FIG. 1, the customer device 116 may provide payment information to the POS system 102 via short-range communication network 118 (e.g., NFC, RFID, Bluetooth®, BLE, etc.).

In at least one example, POS system 102 may communicate with payment server(s) 104 over network(s) 106. The POS system 102 and the payment server(s) 104 may communicate payment information and transaction information to determine whether a transaction is authorized. For example, POS system 102 may provide encrypted payment data, user authentication data, purchase amount information, point-of-purchase information, etc. to payment server(s) 104 over network(s) 106. Payment server(s) 104 may communicate with banking server(s) 120 to determine whether the transaction is authorized and may send an authorization notification to POS system 102 over network(s) 106 to indicate whether the payment transaction is authorized. Payment server(s) 104 may transmit additional information such as transaction identifiers to POS system 102. Based on the authentication notification that is received by the POS system 102 from payment server(s) 104, the payment reader device 110 and the customer device 116 may output respective aspects of a transaction status indication to indicate to the customer 114 whether the transaction is approved. In at least one example, instructions associated with the transaction status indication may be provided by the payment server(s) 104 to the POS terminal 108. The POS terminal 108 may provide instructions to the payment reader device 110, which may provide instructions to the customer device 116 via the short-range communication network 118. In an alternate example, instructions associated with the transaction status indication may be provided by the payment server(s) 104 directly to the POS terminal 108 and the customer device 116. Or, in yet another alternate example, instructions associated with the transaction status indication may be provided by the payment server(s) 104 directly to the payment reader device 110 and the customer device 116. Alternatively, instructions associated with the transaction status indication may be provided by the payment server(s) 104 to the POS terminal 108, which may send instructions to the payment reader device 110 and the customer device 116.

As a non-limiting example, in FIG. 1, the customer device 116 may output a first aspect of a transaction status indication corresponding to a first sound (e.g., "Go!") and the payment reader device 110 may output a second aspect of a transaction status indication corresponding to a sound (e.g., "Team!"). In the non-limiting example shown in FIG. 1, the first sound and the second sound may be output successively. That is, the customer device 116 may output a first sound (e.g., "Go!") prior to the payment reader device 110 outputting a second sound (e.g., "Team!").

Various other audio signals may be utilized to communicate a status of a transaction to the customer 114 and/or the merchant 112. For instance, in some examples, a first aspect or a transaction status indication and a second aspect of the transaction status indication may be output at a same time, at substantially overlapping times, or different times. The first aspect and the second aspect may be a same sound. Or, the first aspect and the second aspect may be different sounds. In some examples, the first aspect and the second aspect may be different sounds that are complementary. As described above, in additional or alternative examples, visual signals may be output as an alternative of or addition to the audio signals. Visual signals may include light displays, rich graphical user interface presentations, etc.

It should be noted that while a short-range communication-enabled electronic device is described throughout, any electronic device that is capable of sharing information with a payment reader device 110 over a wireless network may be used to implement the processes described herein.

Figure 2:
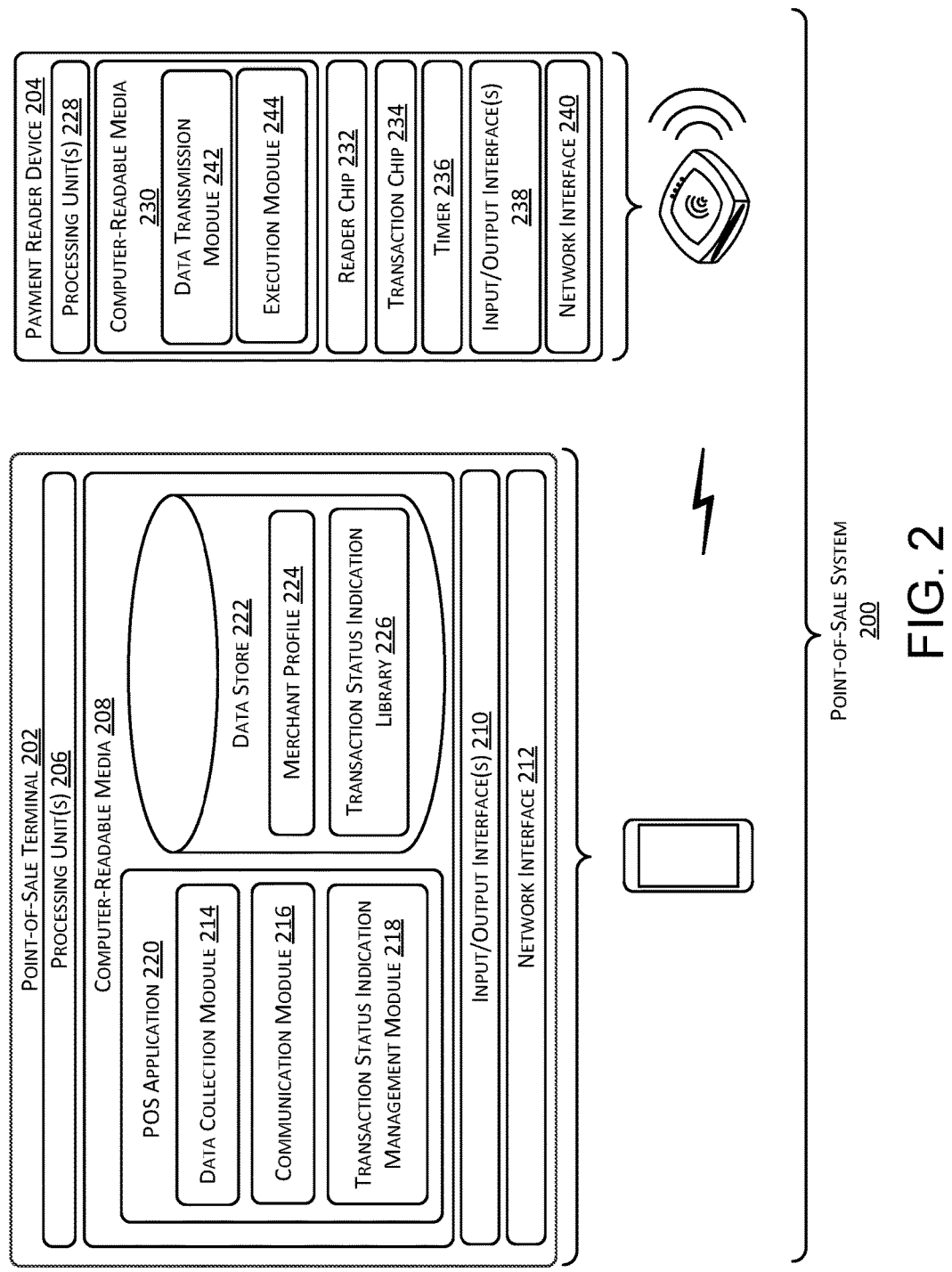
FIG. 2 depicts an illustrative block diagram of a point-of-sale (POS) system in accordance with some examples of the present disclosure.
Figure 3:
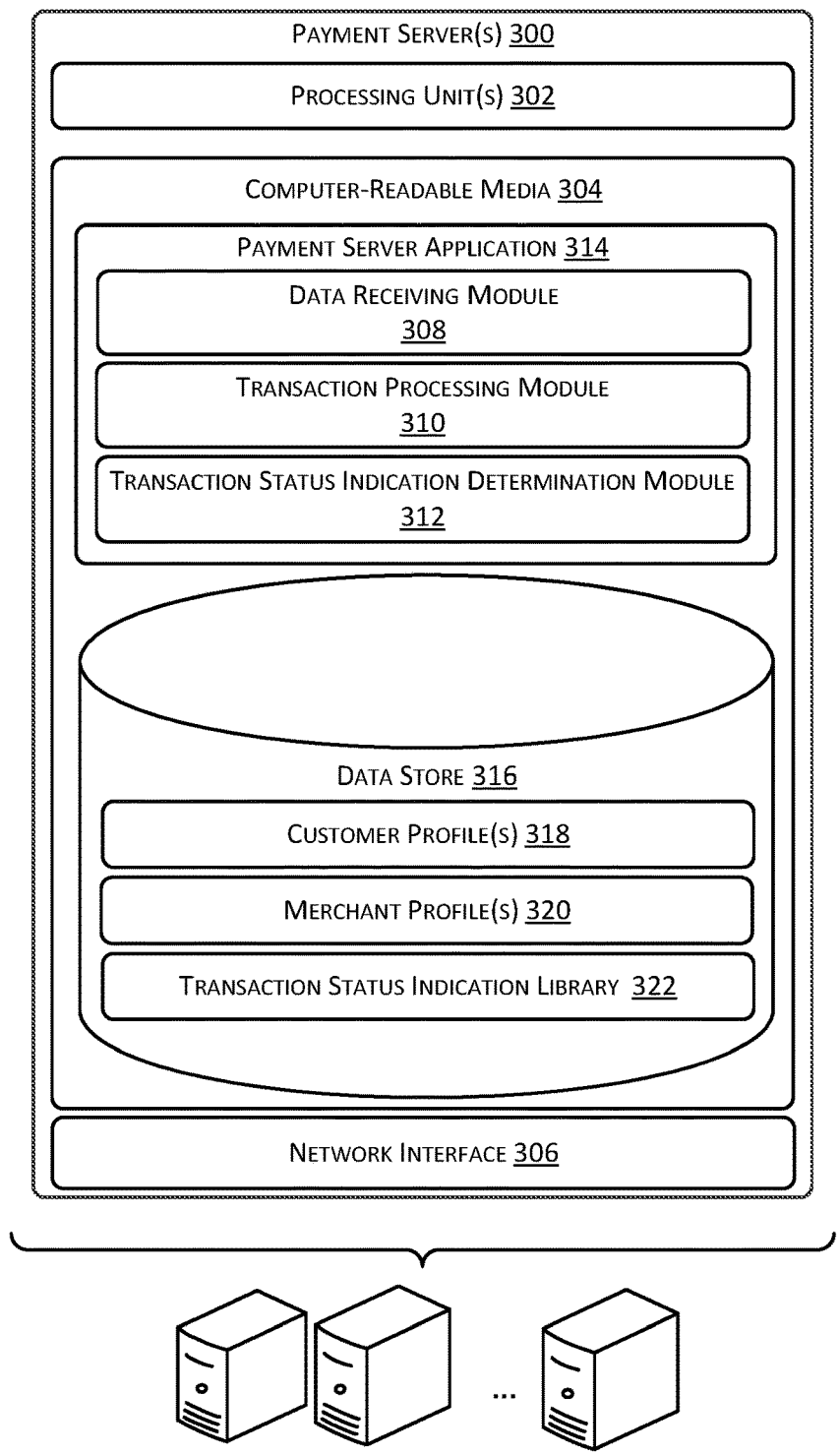
FIG. 3 depicts an illustrative block diagram of server(s) associated with a payment service in accordance with some examples of the present disclosure.
Figure 4:
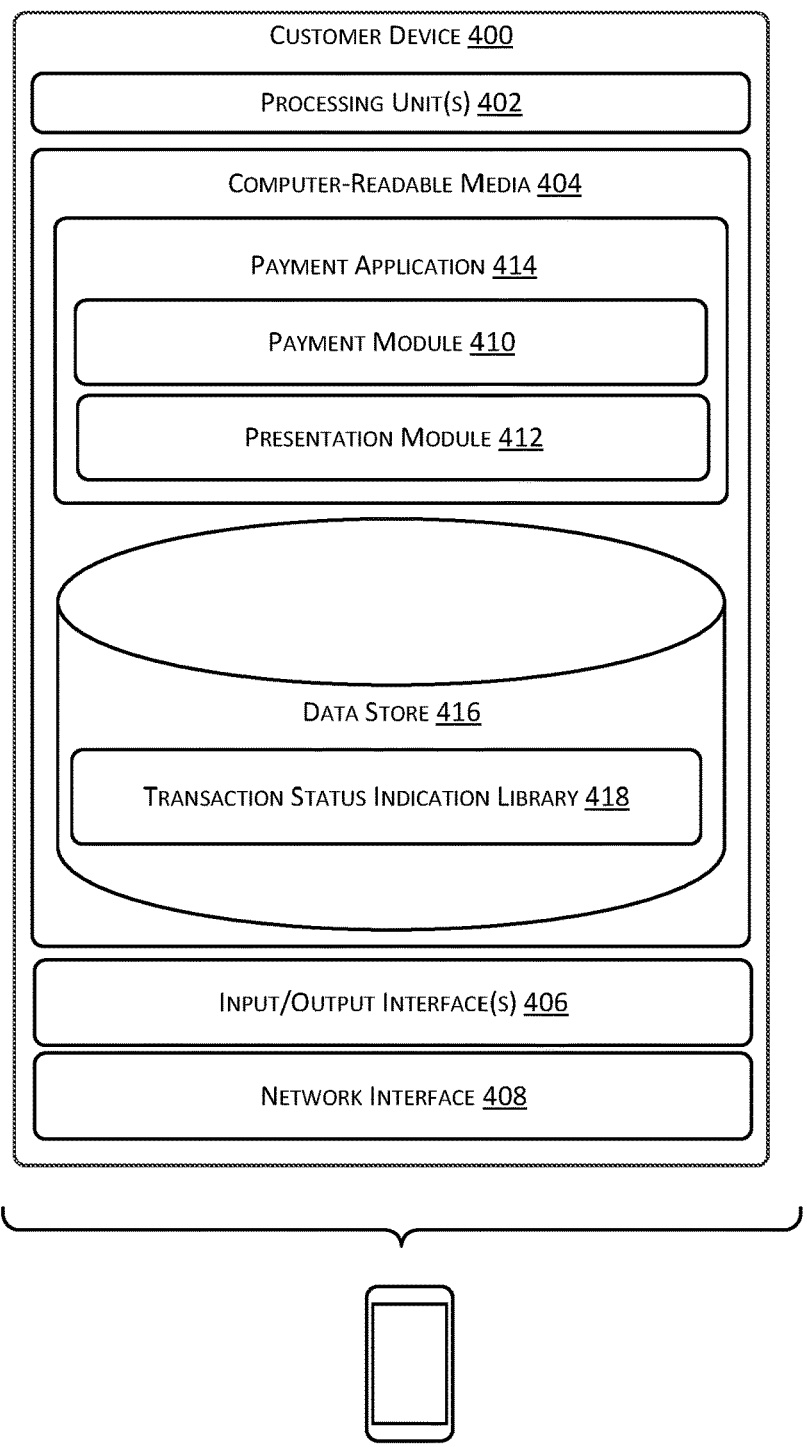
FIG. 4 depicts an illustrative block diagram of a customer device in accordance with some examples of the present disclosure.

FIGS. 2-4 describe individual components of the payment system 100 described above with reference to FIG. 1. As described above, the POS system 102 may be communicatively coupled to payment server(s) 104, a customer device 116, and/or banking server(s) 120 via one or more networks 106. Network(s) 106 may be any type of network known in the art, such as a local area network or a wide area network, such as the Internet, and may include a wireless network, such as a cellular network, a local wireless network, such as Wi-Fi, and/or close-range wireless communications, such as Bluetooth® and BLE, NFC, RFID, a wired network, or any other such network, or any combination thereof. Accordingly, network(s) 106 may include both wired and/or wireless communication technologies, including Bluetooth®, BLE, Wi-Fi and cellular communication technologies, as well as wired or fiber optic technologies. Components used for such communications may depend at least in part upon the type of network, the environment selected, or both. Protocols for communicating over such networks are well known and will not be discussed herein in detail. Consequently, POS system 102, the payment server(s) 104, the customer device 116, and/or the banking server(s) 120 may communicatively couple to network(s) 106 in any manner, such as by a wired or wireless connection. Network(s) 106 may also facilitate communication between the POS system 102, payment server(s) 104, the customer device 116, and/or the banking server(s) 120. In turn, network interfaces associated with each of the components, described below, may be any network interface hardware components that may allow POS system 102, the payment server(s) 104, the customer device 116, and/or the banking server(s) 120 to communicate over the network(s) 106. For example, in a particular implementation, a network interface of the POS terminal 108 may include short-range communication capabilities for performing the communications involved in POS operations between the POS terminal 108 and the payment reader device 110.

FIG. 2 depicts an illustrative block diagram of a point-of-sale (POS) system 200 in accordance with some examples of the present disclosure. The POS system 200 may correspond to POS system 102, described above with reference to FIG. 1. In one example, the POS system 200 may include a POS terminal 202 and a payment reader device 204. The POS terminal 202 and the payment reader device 204 may correspond to the POS terminal 108 and the payment reader device 110, respectively, as described above with reference to FIG. 1.

In one implementation, the POS terminal 202 may be operated and managed by a merchant. Furthermore, the POS terminal 202 may be of a varied hardware and/or software configuration, such that POS terminal 202 may be an Android device, an iOS device, etc. In an example, the POS terminal 202 may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc. The POS terminal 202 may be connected to the payment reader device 204, which is capable of accepting a variety of payment instruments, such as credit cards, debit cards, gift cards, short-range communication based payment instruments, and the like.

The POS terminal 202 may include processing unit(s) 206, computer-readable media 208, input/output interface(s) 210, and a network interface 212. The processing unit(s) 206 of the POS terminal 202 may execute one or more modules and/or processes to cause the POS terminal 202 to perform a variety of functions, as set forth above and explained in further detail in the following disclosure. In some examples, the processing unit(s) 206 may include a central processing unit (CPU), a graphics processing unit (GPU), both CPU and GPU, or other processing units or components known in the art. Additionally, each of the processing unit(s) 206 may possess its own local memory, which also may store program modules, program data, and/or one or more operating systems. Depending on the exact configuration and type of the POS terminal 202, the computer-readable media 208 may include volatile memory (such as RAM), non-volatile memory (such as ROM, flash memory, miniature hard drive, memory card, or the like), or some combination thereof. In various examples, the POS terminal 202 may also have input/output interface(s) 210. Examples of input/output interface(s) 210 may include a keyboard, a mouse, a pen, a voice input device, a touch input device, a camera, a sensor, a display, a speaker, etc. Furthermore, the POS terminal 202 may include a network interface 212 for interfacing with one or more networks (e.g., network(s) 106), as described above.

In at least one example, the computer-readable media 208 may include one or more modules for receiving, determining, and/or accessing transaction data and communicating with payment server(s) (e.g., payment server(s) 104) to attempt to authorize transactions based on the transaction data. Furthermore, the one or more modules may facilitate transaction status indications, as described below. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 206) to configure the POS terminal 202 to execute instructions and to perform operations described herein.

The module(s) may include a data collection module 214, a communication module 216, and a transaction status indication management module 218. In at least one example, the data collection module 214, the communication module 216, and the transaction status indication management module 218, may be associated with a POS application 220. In addition to the module(s), the computer-readable media may include a data store 222, storing a merchant profile 224 and a transaction status indication library 226.

The data collection module 214 may receive, determine, and/or access data associated with transactions (e.g., transaction data) of the merchant. Transaction data may include payment data, identification data, location data, etc. In at least one example, the data collection module 214 may receive payment data from the payment reader device 204. Payment data may include a name of a customer involved in a transaction, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration date associated with the payment instrument, a primary account number (PAN) corresponding to the customer (which may or may not match the number associated with the payment instrument), restrictions on what types of charges/debts may be made, etc. In addition to payment data, the data collection module 214 may receive identification data. The identification data may identify a type of customer device (e.g., iOS, Android, etc.) associated with a transaction.

Moreover, the data collection module 214 may determine location data associated with a transaction. That is, the data collection module 214 may leverage a GPS sensor to determine a geographic location of the POS system 202. The geographic location of the POS system 202 may be indicative of a location associated with the transaction. Additionally, the data collection module 214 may determine data associated with the transaction, such as a cost of the transaction, items (e.g., goods and/or services) acquired via the transaction, etc.

In some examples, the data collection module 214 may access merchant data stored in the merchant profile 224. Merchant data may include information about the merchant (e.g., name of the merchant, geographic location of the merchant, types of items (e.g., goods and/or services) offered for acquisition by the merchant, operating hours of the merchant, a category of the merchant, etc.), accounting information associated with the merchant (e.g., bank(s) that the merchant banks with, etc.), transactional information associated with the merchant (e.g., transactions conducted by the merchant, item(s) associated with the transactions, total spends of each of the transactions, parties to the transactions, dates, times, and/or locations associated with the transactions, etc.), etc.

The communication module 216 may send transaction data and/or merchant data to the payment server(s) (e.g., payment server(s) 104). In at least one example, the communication module 216 may send transaction data to the payment server(s) and the payment server(s) may attempt to authorize payment data associated with the transaction data for a cost of a transaction, as described below. The payment server(s) may send an indication of a status of a transaction back to the communication module 216. That is, in response to a request to authorize payment data for a cost of a transaction, the payment server(s) may send an indication signaling that the transaction is successful (e.g., the payment data is authorized for the cost of the transaction), is unsuccessful (e.g., the payment data is not authorized for the cost of the transaction), requires more information, etc.

The transaction status indication management module 218 may receive instructions associated with transaction status indication(s) from the payment server(s) (e.g., payment server(s) 104). In at least one example, the payment server(s) may send instructions to the transaction status indication management module 218 and the transaction status indication management module 218 may send the instructions to the payment reader device 204. For the purpose of this discussion, a first aspect of a transaction status indication and a second aspect of the transaction status indication may be integrated, and accordingly may be referred to as a transaction status indication. That is, as described above, a transaction status indication may be used herein to describe the integrated output of respective aspects of the transaction status indication via the payment reader device 204 and a customer device. An aspect of a transaction status indication may refer to a portion of the transaction status indication (e.g., audio signal, visual signal, etc.) that is output on a single device. As described above, aspects of a transaction status indication may be output on different devices and the combination of the output of each of the aspects may generate the transaction status indication.

In some examples, the instructions may include first instructions associated with a first aspect of a transaction status indication that is to be output via the payment reader device 204 and second instructions associated with a second aspect of the transaction status indication that is to be output via a customer device (e.g., customer device 116). In such examples, the first instructions may include a first time interval, the lapse of which triggers the payment reader device 204 to output the first aspect of the transaction status indication. And, the second instructions may include a second time interval, the lapse of which triggers the customer device to output the second aspect of the transaction status indication. In some examples, the instructions may include data associated with the transaction status indication. For instance, the first instructions may include first audio data, first image data, etc. which is to be output by the payment reader device 204 and the second instructions may include second audio data, second image data, etc. which is to be output by the customer device. In other examples, the instructions may instruct the transaction status indication management module 218 and/or customer device to access respective transaction status indication libraries, described below, to access data associated with the respective aspects of the transaction status indication.

The data store 222 may be configured to store data so that it may be accessible, manageable, and updatable. In at least one example, the data store 222 may include the merchant profile 224. The merchant profile 224 may store merchant data associated with the merchant including, but not limited to, data including information about the merchant (e.g., name of the merchant, geographic location of the merchant, types of items (e.g., goods and/or services) offered for acquisition by the merchant, operating hours of the merchant, a category (e.g., coffee shop, automotive shop, deli, etc.) of the merchant, etc.), accounting information associated with the merchant (e.g., bank(s) that the merchant banks with, etc.), transactional information associated with the merchant (e.g., transactions conducted by the merchant, item(s) associated with the transactions, total spends of each of the transactions, parties to the transactions, dates, time, and/or dates, times, and/or locations associated with the transactions, etc.), etc. In at least one example, merchant data may be input by the merchant when the merchant registers with the payment service and creates a merchant profile 224. In some examples, the merchant data may be supplemented by data from the payment server(s) 104.

Additionally, the data store 222 may include the transaction status indication library 226. The transaction status indication library 226 may store data associated with transaction status indications. That is, the transaction status indication library 226 may store audio data, image data, etc. associated with the transaction status indications. In an example, the transaction status indication library 226 may include audio data that is mapped to, or otherwise associated with, a successful transaction status indication. Or, the transaction status indication library 226 may include audio data that are mapped to, or otherwise associated with, an unsuccessful transaction status indication. Accordingly, upon receiving instructions to output a particular transaction status indication, the transaction status indication management module 218 may access audio data mapped to, or otherwise associated with, the particular transaction status indication stored in the transaction status indication library 226.

In some examples, the transaction status indication library 226 may be stored on the POS terminal 204 when a merchant purchases the POS terminal 204. That is, the transaction status indication library 226 may be a default sound/image library. In other examples, the merchant may download at least a portion of the transaction status indication library 226. In at least one example, at least a portion of the transaction status indication library 226 may be downloaded in association with the POS application 220. That is, based at least in part on downloading the POS application 220, the POS application 220 may add data associated with one or more transaction status indicators to the transaction status indication library 226. In other examples, the merchant may download at least a portion of the transaction status indication library 226 from a source that is not associated with the POS application 220. In such examples, the transaction status indication management module 218 may send an indication to a payment server application stored on the payment server(s) to indicate that the merchant has downloaded customized transaction status indications. In such examples, the payment server application may map, or otherwise associate, the customized transaction status indications to a merchant profile and/or transaction status indication library stored on the payment server(s).

As described above, the POS terminal 202 may be associated with a payment reader device 204. In one example, the payment reader device 204 may be a wireless communication device that communicates wirelessly with an interactive electronic device such as a POS terminal 202, for example, using short-range communication (e.g., Bluetooth®, BLE, NFC, RFID, etc.). The payment reader device 204 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the payment reader device 204 may include hardware implementation, such as slots, magnetic tracks, and rails with one or more sensors or electrical contacts to facilitate detection and acceptance of a payment instrument. That is, the payment reader device 204 may include hardware implementations to enable the payment reader device 204 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader chip-side first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the payment reader device 204 may also include a biometric sensor to receive and process biometric characteristics and process them as payment instruments, given that such biometric characteristics are registered with a payment service and connected to a financial account with a bank server.

Payment reader device 204 may include processing unit(s) 228, computer-readable media 230, a reader chip 232, a transaction chip 234, a timer 236, input/output interface(s) 238, and a network interface 240. The processing unit(s) 228 of the payment reader device 204 may execute one or more modules and/or processes to cause the payment reader device 204 to perform a variety of functions, as set forth above and explained in further detail in the following disclosure. In some examples, the processing unit(s) 228 may include a CPU, a GPU, a CPU and a GPU, or processing units or components known in the art. Additionally, each of the processing unit(s) 228 may possess its own local memory, which also may store program modules, program data, and/or one or more operating systems. Depending on the exact configuration and type of the payment reader device 204, the computer-readable media 230 may include volatile memory (such as RAM), non-volatile memory (such as ROM, flash memory, miniature hard drive, memory card, or the like), or some combination thereof. In various examples, the payment reader device 204 may also have input/output interface(s) 238. Examples of input/output interface(s) 210 may include a display, a speaker, etc. Furthermore, the payment reader device 204 may include a network interface 240 for interfacing with one or more networks (e.g., network(s) 106), as described above.

In at least one example, the computer-readable media 230 may include one or more modules for receiving payment data and facilitating transaction status indications. That is, in at least one example, the computer-readable media 230 may include one or more modules for receiving instructions associated with transaction status indications and executing the instructions for outputting respective aspects of the transaction status indications. The one or more modules may be implemented as more modules or fewer modules, and functions described for the at least one module may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 228) to configure the payment reader device 204 to execute instructions and to perform operations described herein.

In at least one example, the module(s) may include a data transmission module 242 and an execution module 244. The data transmission module 242 may receive payment data from the transaction chip 234, described below, and may send the payment data to the POS terminal 202. The execution module 244 may receive instructions associated with transaction status indication(s) from the transaction status indication management module 218, send a portion of the instructions to a customer device, and cause another portion of the instructions to be executed by the payment reader device 204.

As described above, the execution module 244 may receive instructions associated with transaction status indication(s) from the transaction status indication management module 218. In some examples, the instructions may include first instructions associated with a first aspect of a transaction status indication that is to be output via the payment reader device 204 and second instructions associated with a second aspect of the transaction status indication that is to be output via a customer device (e.g., customer device 116). In such examples, the first instructions may include a first time interval, the lapse of which triggers the payment reader device 204 to output the first aspect of the transaction status indication. And, the second instructions may include a second time interval, the lapse of which triggers the customer device to output the second aspect of the transaction status indication. In some examples, the instructions may include data associated with the transaction status indication. For instance, the first instructions may include first audio data, first image data, etc. which is to be output by the payment reader device 204 and the second instructions may include second audio data, second image data, etc. which is to be output by the customer device. In other examples, the second instructions may instruct a payment application on a customer device to access a transaction status indication library on the customer device, described below, to access data associated with the second aspect of the transaction status indication.

In at least one example, the execution module 244 may receive the instructions from the transaction status indication management module 218 and may send the second instructions to the customer device via short-range communication network. Additionally, the execution module 244 may determine when to output a respective aspect of the transaction status indication via the payment reader device 204. For instance, based at least in part on receiving a timer signal from the timer 236, the execution module 244 may determine a lapse of time that is equal to the first time interval. As such, the execution module 244 may cause the respective aspect of the transaction status indication to be output via the input/output interface(s) 238 at a first time.

The reader chip 230 may perform functionalities to control the operations and processing of the payment reader device 204. That is, the reader chip 230 may perform functionalities to control payment interfaces (e.g., a contactless interface, a contact interface, etc.), a wireless communication interface, a wired interface, a user interface (e.g., a signal condition device (FPGA)), etc. Additionally, the reader chip 230 may perform functionalities to control the timer 234, which may provide a timer signal indicating an amount of time that has lapsed following a particular event (e.g., receiving instructions associated with a transaction status indication). Furthermore, the reader chip 230 may perform functionalities to control the network interface 240, which may interface with one or more networks (e.g., network(s) 106), as described above.

The transaction chip 232 may perform functionalities relating to processing of payment transactions, interfacing with payment instruments, cryptography, and other payment-specific functionality. That is, the transaction chip 232 may access payment data associated with a payment instrument and may provide the payment data to the POS terminal 208, which may provide the payment data to payment server(s) (e.g., payment server(s) 104) for facilitating transactions between the merchant and customer(s). The payment data may include a name of a customer, an address of the customer, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to the customer (which may or may not match the number associated with the payment instrument), restrictions on what types of charges/debts may be made, etc. Additionally, the transaction chip 232 may encrypt the payment data upon receiving the payment data.

It should be understood that in some examples, the reader chip 230 may have its own processing unit(s) and computer-readable media and/or the transaction chip 232 may have its own processing unit(s) and computer-readable media. In other examples, the functionalities of reader chip 230 and transaction chip 232 may be embodied in a single chip or a plurality of chips, each including any suitable combination of processing units and computer-readable media to collectively perform the functionalities of reader chip 230 and transaction chip 232 as described herein.

It also should be understood that, in an alternate example, the POS terminal 202 and the payment reader device 204 may be integrated into a single device. In an example, the data transmission module 242 and the execution module 244 may be associated with POS application 220. In such an example, the transaction status indication management module 218 may send instructions to the execution module 244. However, the transaction status indication management module 218 may send instructions to the execution module 244, which may be on a same device and accordingly, the POS terminal 202 would not be sending instructions to the payment reader device 204. In contrast, in such an example, the single device associated with the POS terminal 202 and the payment reader device 204 may process first instructions for outputting a first aspect of a transaction status indication via the single device and may send second instructions for outputting a second aspect of a transaction status indication via a customer device.

FIG. 3 depicts an illustrative block diagram of payment server(s) 300 associated with a payment service in accordance with some examples of the present disclosure. The payment server(s) 300 may correspond to payment server(s) 104 described above with reference to FIG. 1.

The payment server(s) 300 may exchange data with the POS system (e.g., POS system 200) via network(s) (e.g., network(s) 106), as described above. In an example, the payment server(s) 300 may be associated with a payment service provider. Examples support scenarios where device(s) that may be included in the payment server(s) 300 may include one or more computing devices that operate in a cluster or other configuration to share resources, balance load, increase performance, provide fail-over support or redundancy, or for other purposes. Device(s) that may be included in the payment server(s) 300 may include any type of computing device having processing units operably connected to computer-readable media such as via a bus, which in some instances may include one or more of a system bus, a data bus, an address bus, a PCI bus, a Mini-PCI bus, and any variety of local, peripheral, and/or independent buses. In at least one configuration, the computer-readable media of the payment server(s) 300 may include module(s) as described above. Alternatively, or in addition, the functionality described herein may be performed, at least in part, by one or more hardware logic components such as accelerators. For example, and without limitation, illustrative types of hardware logic components that may be used include FPGAs, Application-Specific Integrated Circuits (ASICs), Application-Specific Standard Products (ASSPs), System-on-a-Chip Systems (SOCs), Complex Programmable Logic Devices (CPLDs), etc.

In an example, the payment server(s) 300 may include processing unit(s) 302, computer-readable media 304, and a network interface 306. The processing unit(s) 302 of the payment server(s) 300 may execute one or more modules and/or processes to cause the payment server(s) 300 to perform a variety of functions, as set forth above and explained in further detail in the following disclosure. In some examples, the processing unit(s) 302 may include a CPU, a GPU, both CPU and GPU, or other processing units or components known in the art. Additionally, each of the processing unit(s) 302 may possess its own local memory, which also may store program modules, program data, and/or one or more operating systems. Depending on the exact configuration and type of the payment server(s) 300, the computer-readable media 304 may include volatile memory (such as RAM), non-volatile memory (such as ROM, flash memory, miniature hard drive, memory card, or the like), or some combination thereof. The payment server(s) 300 may include a network interface 306 for interfacing with one or more networks (e.g., network(s) 106), as described above.

In at least one example, the computer-readable media 304 may include one or more modules for receiving and processing transaction data, determining instructions for transaction status indications, and sending the instructions for the transaction status indications to POS systems (e.g., POS system 200). The one or more modules may be implemented as more modules or as fewer modules, and functions described for the modules may be redistributed depending on the details of the implementation. As described above, term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an API to perform some or all of its functionality (e.g., operations). In additional and/or alternative examples, the module(s) may be implemented as computer-readable instructions, various data structures, and so forth via at least one processing unit (e.g., processing unit(s) 302) to configure the payment server(s) 300 to execute instructions and to perform operations described herein.

The module(s) may include a data receiving module 308, a transaction processing module 310, and a transaction status indication determination module 312. In at least one example, the data receiving module 308, the transaction processing module 310, and the transaction status indication determination module 312 may be associated with a payment server application 314. Additionally, the computer-readable media 304 may include a data store 316 which may store customer profile(s) 318, merchant profile(s) 320, and a transaction status indication library 322.

The data receiving module 308 may receive, determine, and/or access transaction data, merchant data, etc. In some examples, the data receiving module 308 may receive transaction data from POS systems (e.g., POS system 200). As described above, transaction data may include payment data (e.g., a name of a customer, an address of the customer, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to the customer, restrictions on what types of charges/debts may be made, etc.) associated with individual transactions. In addition to payment data, the transaction data may include identification data, identifying types of devices (e.g., iOS, Android, etc.) associated with individual transactions. Moreover, transaction data may include location data associated with individual transactions. Additionally, transaction data may include information associated with individual transactions, such as a total spend associated with individual transactions, items (e.g., goods and/or services) acquired via individual transactions, etc.

In some examples, the data receiving module 308 may receive merchant data (e.g., information about merchant(s) (e.g., names of merchant(s), geographic locations of the merchant(s), types of items (e.g., goods and/or services) offered for acquisition by the merchant(s), operating hours of the merchant(s), categories of merchant(s), etc.), accounting information associated with merchant(s) (e.g., bank(s) that merchant(s) banks with, etc.), transactional information associated with merchant(s) (e.g., transactions conducted by merchant(s), item(s) associated with the transactions, total spends of each of the transactions, parties to the transactions, dates, times, and/or locations associated with the transactions, etc.), etc.) from POS systems. In at least one example, the data receiving module 308 may receive at least some merchant data when merchant(s) set up merchant profile(s). The merchant data may be updated over time. In some examples, the merchant data may be updated by the data receiving module 308. In at least one example, the merchant data may be mapped to merchant profile(s) 320 in the data store 316, as described below.

In some examples, the data receiving module 308 may determine transaction data. In at least one example, transaction data may include event data. In some examples, the data receiving module 308 may leverage the data received from POS systems to determine that a transaction is associated with an event. Examples of events may include sporting events, concerts, pop-up shops, farmers markets, etc. For instance, if a transaction is associated with location data corresponding to a particular stadium (e.g., Levi's Stadium, CenturyLink Field, etc.), the data receiving module 308 may determine that the transaction is associated with a sporting event (e.g., a San Francisco 49ers football game, a Seattle Seahawks football game, etc.). In some examples, the data receiving module 308 may access calendars or other event schedules to identify particular events associated with transactions. For instance, both the Seattle Seahawks and the Seattle Sounders play at CenturyLink Field. Accordingly, the data receiving module 308 may access an event schedule to determine whether a transaction is associated with a Seattle Seahawks game or a Seattle Sounders game. In other examples, the data receiving module 308 may prompt a merchant to indicate whether the merchant is conducting transactions at an event and specify which event.

In additional and/or alternative examples, at least some of the transaction data, merchant data, etc. may be stored in the data store 316. In such examples, the data receiving module 308 may access transaction data, merchant data, etc. in the data store 316.

The transaction processing module 310 may access payment data and send the payment data to banking server(s) (e.g., banking server(s) 120) to process transactions. In at least one example, the transaction processing module 310 may send payment data to a banking server to request authorization of the payment data for a cost of a transaction. The banking server may process the request for authorization and may send a response back to the transaction processing module 310. The response may indicate a status of the transaction. That is, the response may indicate whether the transaction is successful (e.g., the payment data is authorized for the cost of the transaction) or unsuccessful (e.g., the payment data is not authorized for the cost of the transaction), or whether additional information is needed to process the transaction.

The transaction status indication determination module 312 may determine transaction status indications and send instructions associated with the transaction status indications to POS system(s) (e.g., POS system 200). In at least one example the transaction status indication determination module 312 may access statuses of transactions and access transaction data associated with the transactions to determine appropriate transaction status indications for particular transactions. That is, based at least in part on receiving a response from a banking server regarding a status of a transaction, the transaction status indication determination module 312 may determine a transaction status indication that is to be communicated back to the merchant and/or customer based at least in part on transaction data associated with the transaction.

As described above, transaction status indications may be specific to merchants, merchant characteristics, transaction characteristics, customer characteristics, device types, events, locations, etc. The transaction status indication determination module 312 may access a response associated with a transaction status. Based at least in part on the transaction status and transaction data associated with the transaction, customer data, and/or merchant data, the transaction status indication determination module 312 may access the transaction status indication library 322 to determine an appropriate transaction status indication. Additional details associated with determining transaction status indications are described below with reference to FIG. 5.

The data store 316 may be configured to store data so that it may be accessible, manageable, and updatable. In at least one example, the data store 316 may include customer profile(s) 318. One or more data items may be mapped to, or otherwise associated with, the customer profile(s) 318. For instance, data including demographic information about a customer (e.g., name, address, age, birthdate, profession, marital status, etc.), contact information associated with the customer (e.g., telephone number(s), email address(es), etc.), preferences of the customer (e.g., emailed or paper receipt, etc.), payment instruments associated with the customer (e.g., credit cards, debit card, gift cards, short-range communication based payment instruments, etc.), etc. may be mapped to, or otherwise associated with, customer profile(s) 318 corresponding to the customer. In at least one example, loyalty programs and status levels (some, within the loyalty plans) may also be mapped to, or otherwise associated with, customer profile(s) 318 corresponding to the customer. Additionally and/or alternatively, device(s) and/or device type(s) used by a customer may be mapped to a customer profile 318 corresponding to a customer.

Additionally, the data store 316 may include merchant profile(s) 320. One or more data items may be mapped to, or otherwise associated with, the merchant profile(s) 320. For instance, data including information about a merchant (e.g., name of the merchant, geographic location of the merchant, types of items (e.g., goods and/or services) offered for acquisition by the merchant, operating hours of the merchant, a category of the merchant, etc.), accounting information associated with the merchant (e.g., bank(s) that the merchant banks with, etc.), transactional information associated with the merchant (e.g., transactions conducted by the merchant, item(s) associated with the transactions, total spends of each of the transactions, parties to the transactions, dates, times, and/or locations associated with the transactions, etc.), etc. may be mapped to a merchant profile 320 corresponding to the merchant. In some examples, at least some of the data stored in a merchant profile on a POS terminal, as described above with respect to FIG. 2, may be duplicated and stored in the merchant profile 320 stored in the data store 316. In some examples, additional and/or alternative data may be stored in merchant profile(s) stored on POS terminal(s), as described above with respect to FIG. 2, and the merchant profile(s) 320 stored in the data store 316

Additionally, the data store 316 may include the transaction status indication library 322. The transaction status indication library 322 may store data and/or instructions associated with transaction status indications. In at least one example, individual transaction status indications may be mapped to, or associated with, merchants, customers, transaction characteristics, customer characteristics, device types, events, locations, etc.

In at least one example, the payment service associated with the payment server 300 may have various transaction status indications stored in the transaction status indication library 322. As an example, the payment service may have a success transaction status indication that is specific to the payment service stored in the transaction status indication library 322 that is to be output to communicate a successful transaction. Additionally and/or alternatively, the payment service may have an unsuccessful transaction status indication that is specific to the payment service stored in the transaction status indication library 322 that is to be output to communicate an unsuccessful transaction. Additionally, the payment service may have specific transaction status indications for certain events, locations, customer devices, customer characteristics, merchant characteristics, transaction characteristics, etc. that are to be output when transaction(s) are associated with the events, locations, customer devices, customer characteristics, merchant characteristics, transaction characteristics, etc.

In additional and/or alternative examples, merchants and/or customers may be associated with particular transaction status indications. In at least one example, a particular merchant may have various transaction status indications mapped to, or otherwise associated with, the particular merchant in the transaction status indication library 322. As an example, the particular merchant may have a success transaction status indication that is specific to the merchant mapped to, or otherwise associated with, the particular merchant that is to be output to communicate a successful transaction. Additionally and/or alternatively, the particular merchant may have an unsuccessful transaction status indication that is specific to the merchant mapped to, or otherwise associated with, the particular merchant that is to be output to communicate an unsuccessful transaction.

Additionally or alternatively, a particular merchant may have transaction status indications that are specific to certain items (e.g., goods and/or services) offered for acquisition by the merchant that may be mapped to, or otherwise associated with, the particular merchant that is to be output when a transaction is associated with the certain items. Moreover, a particular merchant may have transaction status indications that are specific to levels of spending that may be mapped to, or otherwise associated with, the particular merchant that are to be output when a transaction is associated with a certain level of spending. Additionally, particular merchants may have specific transaction status indications for certain events, locations, customer devices, customer characteristics, merchant characteristics, transaction characteristics, etc. that may be mapped to, or otherwise associated with, the particular merchant that are to be output when transaction(s) are associated with the events, locations, customer devices, customer characteristics, merchant characteristics, transaction characteristics, etc.

In some examples, a particular customer may have one or more transaction status indications mapped to, or otherwise associated with, the particular customer in the transaction status indication library 322. As an example, the particular customer may have a success transaction status indication that is specific to the customer mapped to, or otherwise associated with, the particular customer that is to be output to communicate a successful transaction. Additionally and/or alternatively, the particular customer may have an unsuccessful transaction status indication that is specific to the customer mapped to, or otherwise associated with, the particular customer that is to be output to communicate an unsuccessful transaction. As described below, in some examples, a customer may download customized transaction status indications. In such examples, the customized transaction status indications may be mapped to, or otherwise associated with, the particular customer.

In some examples, the transaction status indication library 322 may store data associated with the particular transaction status indications. That is, in such examples, the transaction status indication library 322 may store audio data, image data, etc. associated with particular transaction status indications. In other examples, the transaction status indication library 322 may store instructions which direct a POS terminal and/or a customer device to access audio data, an image data, etc. associated with particular transaction status indications in local data stores.

FIG. 4 depicts an illustrative block diagram of a customer device 400 in accordance with some examples of the present disclosure. Customer device 400 may correspond to the customer device 116 described above with reference to FIG. 1.

In one example, a customer may utilize a device (i.e., customer device 400) as a payment instrument. The customer device 400 may be of a varied hardware and/or software configuration, such that customer device 400 may be an Android device, an iOS device, etc. In an example, customer device 400 may be any type of computing device such as a tablet computing device, a smart phone or mobile communication device, a laptop, a netbook or other portable computer or semi-portable computer, a wearable computing device or other body-mounted computing device, an augmented reality device, etc.

Customer device 400 may include processing unit(s) 402, computer-readable media 404, input/output interface(s) 406, and a network interface 408. The processing unit(s) 402 of the customer device 400 may execute one or more modules and/or processes to cause the customer device 400 to perform a variety of functions, as set forth above and explained in further detail in the following disclosure. In some examples, the processing unit(s) 402 may include a CPU, a GPU, both CPU and GPU, or other processing units or components known in the art. Additionally, each of the processing unit(s) 402 may possess its own local memory, which also may store program modules, program data, and/or one or more operating systems. Depending on the exact configuration and type of the customer device 400, the computer-readable media 404 may include volatile memory (such as RAM), non-volatile memory (such as ROM, flash memory, miniature hard drive, memory card, or the like), or some combination thereof. In various examples, the customer device 400 may also have input/output interface(s) 406. Examples of input/output interface(s) 406 may include a keyboard, a mouse, a pen, a voice input device, a touch input device, a camera, a sensor, a display, a speaker, etc. Furthermore, the customer device 400 may include a network interface 408 for interfacing with the network(s) (e.g., network(s) 106), as described above.

In at least one example, the computer-readable media 404 may include one or more modules for providing payment information and outputting transaction status indications. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they that may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 402) to configure customer device 400 to execute instructions and to perform operations described herein. The module(s) may include a payment module 410 and a presentation module 412. In at least one example, the payment module 410 and the presentation module 412 may be associated with a payment application 414. In addition to the module(s), the computer-readable media may include a data store 416, storing a local transaction status indication library 418.

The payment module 410 may provide payment data to a payment reader device (e.g., payment reader device 204). As described above, payment data may include a name of a customer, an address of the customer, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to the customer, restrictions on what types of charges/debts may be made, etc. In some examples, the payment module 410 may provide identification data to the payment reader device, identifying the type of the customer device 400 (e.g., iOS, Android, etc.). In at least one example, the payment module 410 may detect the presence of a short-range communication network associated with a payment reader device. The payment module 410 may leverage the strength of the short-range communication signal, or another indication, to determine that the customer device 400 is within a threshold distance of the payment reader device. Based at least in part on determining that the customer device 400 is within a threshold distance of the payment reader device, the payment module 410 may send the payment data to the payment reader device, as described above. In some examples, the payment module 410 may detect a biometric authentication prior to sending the payment data to the payment reader device.

The presentation module 412 may receive instructions associated with a transaction status indication and may cause a respective aspect of the transaction status indication to be output via the input/output interface(s) 406. In at least one example, the presentation module 412 may receive instructions from a payment reader device (e.g., payment reader device 204). In other examples, the presentation module 412 may receive instructions from payment server(s) (e.g., payment server(s) 300) or a POS terminal (e.g., POS terminal 202). In some examples, the instructions may include data associated with a respective aspect of the transaction status indication. That is, the instructions may include audio data, image data, etc. In other examples, the instructions may instruct the presentation module 412 to access data associated with the respective aspect of the transaction status indication from the transaction status indication library 418. In at least one example, the instructions may include a time interval, the lapse of which indicates when the respective aspect of the transaction status indication is to be output by the customer device 400. Accordingly, the presentation module 412 may determine, after receiving the instructions, an amount of time that has lapsed is equal to the time interval and, the presentation module 412 may cause the respective aspect of the transaction status indication to be output via the input/output interface(s) 406.

The data store 416 may be configured to store data so that it may be accessible, manageable, and updatable. In at least one example, the data store 416 may include the transaction status indication library 418. The transaction status indication library 418 may store data associated with transaction status indications. That is, the transaction status indication library 418 may store audio data, image data, etc. associated with the transaction status indications. In an example, the transaction status indication library 418 may include audio data that is mapped to, or otherwise associated with, a successful transaction status indication. Or, the transaction status indication library 418 may include audio data that are mapped to, or otherwise associated with, an unsuccessful transaction status indication. Accordingly, upon receiving instructions to output a particular transaction status indication, the presentation module 412 may access audio data mapped to, or otherwise associated with, the particular transaction status indication stored in the transaction status indication library 418.

In some examples, the transaction status indication library 418 may be stored on the customer device 400 when the customer purchases the customer device 400. That is, the transaction status indication library 418 may be a default sound/image library. In other examples, the customer may download at least a portion of the transaction status indication library 418. In at least one example, at least a portion of the transaction status indication library 418 may be downloaded in association with the payment application 414. That is, based at least in part on downloading the payment application 414, the payment application 414 may add data associated with one or more transaction status indicators to the transaction status indication library 418. In other examples, the customer may download at least a portion of the transaction status indication library 418 from a source that is not associated with the payment application 414. In such examples, the presentation module 412 may send an indication to a payment server application stored on the payment server(s) to indicate that the customer has downloaded customized transaction status indications. In such examples, the payment server application may map, or otherwise associate, the customized transaction status indications to a customer profile and/or transaction status indication library stored on the payment server(s).

Figure 6:
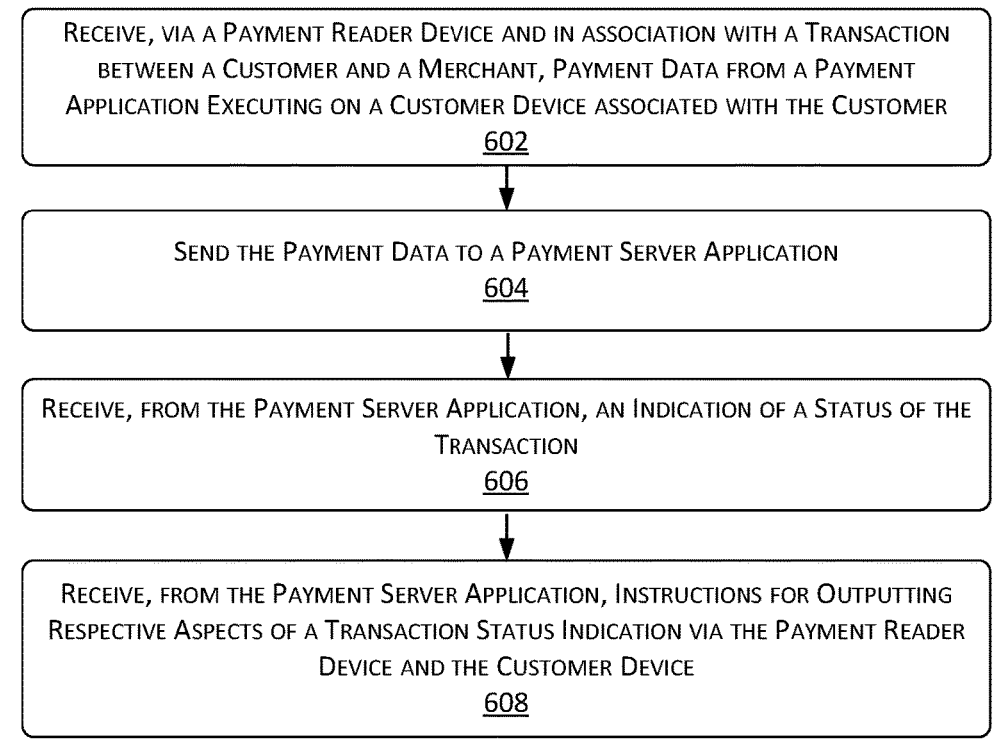
FIG. 6 depicts a non-limiting flow diagram illustrating a method for receiving instructions for outputting respective aspects of a transaction status indication via a payment reader device and a customer device.
Figure 7:
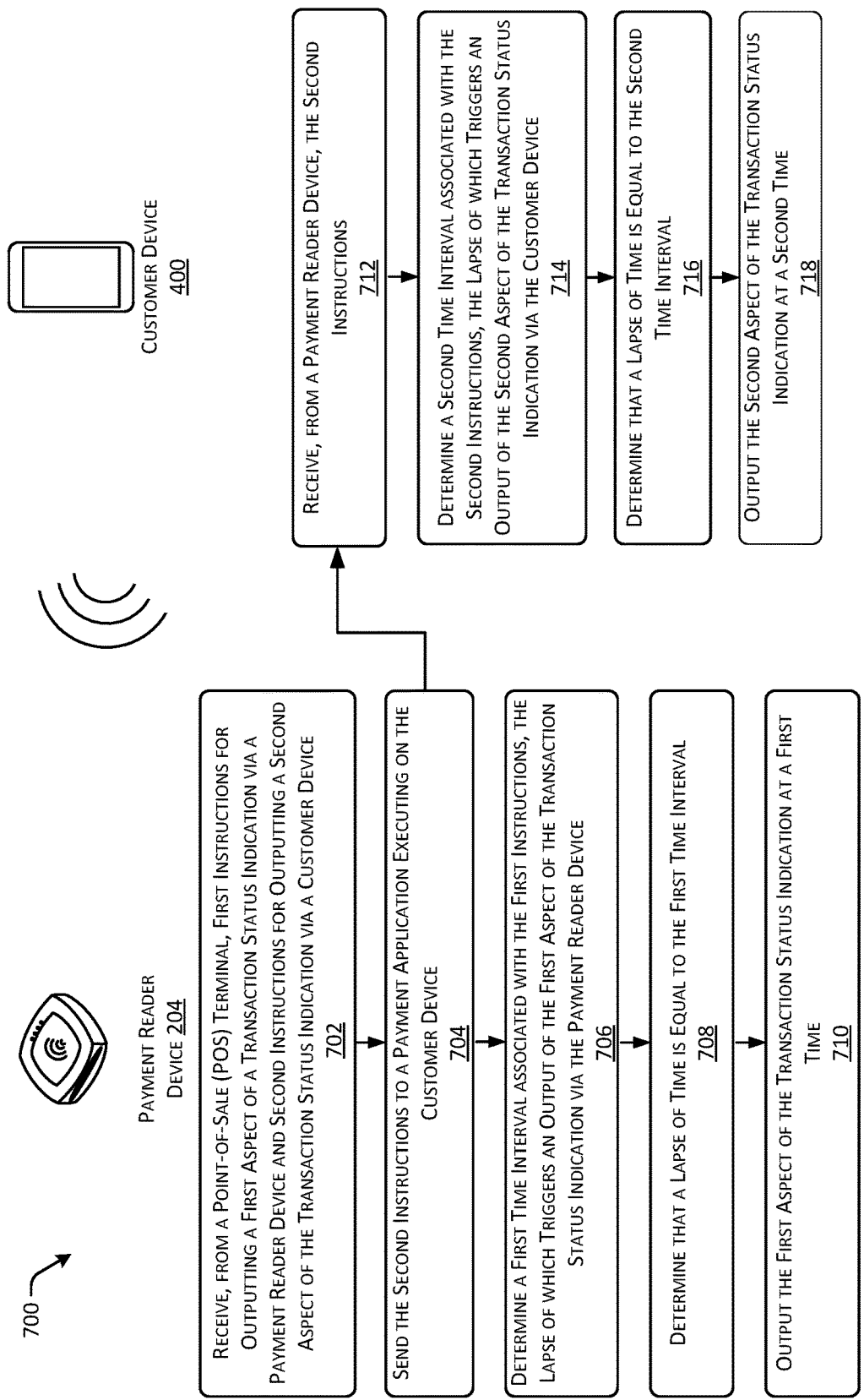
FIG. 7 depicts a non-limiting flow diagram illustrating a method for receiving instructions for outputting respective aspects of a transaction status indication via a payment reader device and a customer device, sending instructions to the customer device, and outputting the respective aspects of the transaction status indication via the payment device and the customer device.

FIGS. 5-7 are non-limiting flow diagrams illustrating various methods that are in accordance with some examples of the present disclosure. FIGS. 5-7 are described within the environments described in FIGS. 2-4, but are not limited to such environments.

FIG. 5 depicts a non-limiting flow diagram illustrating a method 500 for determining a transaction status indication corresponding to a status of a transaction and sending the transaction status indication to a POS system for presentation of respective aspects of the transaction status indication via a payment reader device of the POS system and a customer device.

Block 502 illustrates receiving, from a POS system, transaction data associated with a transaction between a customer and a merchant. As described above, payment server(s) 300 associated with a payment service may have a data receiving module 308 stored thereon, which may receive, determine, and/or access transaction data, merchant data, etc. In some examples, the data receiving module 308 may receive transaction data from a POS system 200. As described above, transaction data may include payment data (e.g., a name of a customer, an address of the customer, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to the customer, restrictions on what types of charges/debts may be made, etc.).

Block 504 illustrates sending, to a banking server, a request to authorize payment data associated with the transaction data for a cost of the transaction. In at least one example, a transaction processing module 310 may be stored on the payment server(s) 300, which may access payment data associated with the transaction data and send the payment data to banking server(s) (e.g., banking server(s) 120) to process transactions. In at least one example, the transaction processing module 310 may send payment data to a banking server to request authorization of the payment data for a cost of the transaction between the customer and the merchant.

Block 506 illustrates receiving, from the banking server, a response indicating a status of the transaction. In at least one example, the banking server may process the request for authorization and may send a response back to the transaction processing module 310. The response may indicate a status of the transaction. That is, the response may indicate whether the transaction is successful (e.g., the payment data is authorized for the cost of the transaction) or is unsuccessful (e.g., the payment data is not authorized for the cost of the transaction), or whether additional information is needed to process the transaction.

Block 508 illustrates determining a transaction status indication corresponding to the status. In at least one example, the payment server(s) 300 may include a transaction status indication determination module 312, which may determine transaction status indications. In at least one example, the transaction status indication determination module 312 may access statuses of transactions and access transaction data associated with the transactions to determine appropriate transaction status indications for particular transactions. That is, based at least in part on receiving a response from a banking server regarding a status of the transaction, the transaction status indication determination module 312 may determine a transaction status indication that is to be communicated back to the merchant and/or customer based at least in part on transaction data associated with the transaction. In some examples, the transaction status indication determination module 312 may consider merchant data and/or customer data in determining a transaction status indication that is to be communicated back to the merchant and/or customer.

As described above, transaction status indications may be specific to customers, merchants, merchant characteristics, transaction characteristics, customer characteristics, device types, events, locations, etc. The transaction status indication determination module 312 may access a response associated with a transaction status. Based at least in part on the transaction status and transaction data, merchant data, and/or customer data, the transaction status indication determination module 312 may access the transaction status indication library 322 to determine a transaction status indication.

As a non-limiting example, the transaction status indication determination module 312 may determine, based on the transaction data, an event associated with a transaction. In some examples, different transaction status indications may be mapped to, or otherwise associated with, different events in the transaction status indication library 322. In at least one example, a transaction status indication may be mapped to, or otherwise associated with, the event in the transaction status indication library 322. Accordingly, the transaction status indication determination module 312 may determine that the transaction status indication that is mapped to, or otherwise associated with, the event is the appropriate transaction status indication for the transaction. As such, the transaction status indication determination module 312 may send instructions associated with the transaction status indication to the POS system 200, as described below. For instance, if a response associated with a transaction status indicates that a transaction associated with a particular event is successful, the transaction status indication determination module 312 may access a successful transaction status indication mapped to, or otherwise associated with, the particular event in the transaction status indication library 322, and may send instructions associated with the successful transaction status indication to the POS system 200.

As another non-limiting example, the transaction status indication determination module 312 may determine, based on the transaction data, a location associated with a transaction. In some examples, different transaction status indications may be mapped to, or otherwise associated with, different locations in the transaction status indication library 322. In at least one example, a transaction status indication may be mapped to, or otherwise associated with, the location in the transaction status indication library 322. Accordingly, the transaction status indication determination module 312 may determine that the transaction status indication that is mapped to, or otherwise associated with, the location is the appropriate transaction status indication for the transaction. As such, the transaction status indication determination module 312 may send instructions associated with the transaction status indication to the POS system 200, as described below. For instance, if a response associated with a transaction status indicates that a transaction associated with a particular location is successful, the transaction status indication determination module 312 may access a successful transaction status indication mapped to, or otherwise associated with, the particular location in the transaction status indication library 322, and may send instructions associated with the successful transaction status indication to the POS system 200.

In some examples, appropriate transaction status indications may be based on characteristics of transactions. As a non-limiting example, the transaction status indication determination module 312 may determine, based on the transaction data, a total spend associated with a transaction. In some examples, different transaction status indications may be mapped to, or otherwise associated with, different total spends in the transaction status indication library 322. In at least one example, a transaction status indication may be mapped to, or otherwise associated with, the total spend in the transaction status indication library 322. Accordingly, the transaction status indication determination module 312 may determine that the transaction status indication that is mapped to, or otherwise associated with, the total spend is the appropriate transaction status indication for the transaction. As such, the transaction status indication determination module 312 may send instructions associated with the transaction status indication to the POS system 200, as described below. For instance, if a response associated with a transaction status indicates that a transaction associated with a total spend is successful, the transaction status indication determination module 312 may access a successful transaction status indication mapped to, or otherwise associated with, the total spend in the transaction status indication library 322, and may send instructions associated with the successful transaction status indication to the POS system 200.

As another non-limiting example, the transaction status indication determination module 312 may determine, based on the transaction data, an item (e.g., good or service) associated with a transaction. In some examples, different transaction status indications may be mapped to, or otherwise associated with, different items in the transaction status indication library 322. In at least one example, a transaction status indication may be mapped to, or otherwise associated with, the item in the transaction status indication library 322. Accordingly, the transaction status indication determination module 312 may determine that the transaction status indication that is mapped to, or otherwise associated with, the item is the appropriate transaction status indication for the transaction. As such, the transaction status indication determination module 312 may send instructions associated with the transaction status indication to the POS system 200, as described below. For instance, if a response associated with a transaction status indicates that a transaction associated with a particular item is successful, the transaction status indication determination module 312 may access a successful transaction status indication mapped to, or otherwise associated with, the particular item in the transaction status indication library 322, and may send instructions associated with the successful transaction status indication to the POS system 200.

In some examples, the transaction status indication determination module 312 may determine an appropriate transaction status indication based on merchant data. As a non-limiting example, the transaction status indication determination module 312 may determine, based on the merchant data, an identity of a merchant associated with a transaction. In some examples, different transaction status indications may be mapped to, or otherwise associated with, different merchants in the transaction status indication library 322. In at least one example, a transaction status indication may be mapped to, or otherwise associated with, the merchant in the transaction status indication library 322. Accordingly, the transaction status indication determination module 312 may determine that the transaction status indication that is mapped to, or otherwise associated with, the merchant is the appropriate transaction status indication for the transaction. As such, the transaction status indication determination module 312 may send instructions associated with the transaction status indication to the POS system 200, as described below. For instance, if a response associated with a transaction status indicates that a transaction associated with a particular merchant is successful, the transaction status indication determination module 312 may access a successful transaction status indication mapped to, or otherwise associated with, the particular merchant in the transaction status indication library 322, and may send instructions associated with the successful transaction status indication to the POS system 200.

As a non-limiting example, the transaction status indication determination module 312 may determine, based on the merchant data, a category of a merchant associated with a transaction. In some examples, different transaction status indications may be mapped to, or otherwise associated with, different categories of merchants in the transaction status indication library 322. In at least one example, a transaction status indication may be mapped to, or otherwise associated with, the category of the merchant in the transaction status indication library 322. Accordingly, the transaction status indication determination module 312 may determine that the transaction status indication that is mapped to, or otherwise associated with, the category of the merchant is the appropriate transaction status indication for the transaction. As such, the transaction status indication determination module 312 may send instructions associated with the transaction status indication to the POS system 200, as described below. For instance, if a response associated with a transaction status indicates that a transaction associated with a category of a merchant is successful, the transaction status indication determination module 312 may access a successful transaction status indication mapped to, or otherwise associated with, the category of the merchant in the transaction status indication library 322, and may send instructions associated with the successful transaction status indication to the POS system 200.

In some examples, the transaction status indication determination module 312 may determine an appropriate transaction status indication based on customer data. As a non-limiting example, the transaction status indication determination module 312 may determine, based on customer data, a loyalty program with which a customer is associated. In some examples, different transaction status indications may be mapped to, or otherwise associated with, different loyalty programs in the transaction status indication library 322. In at least one example, a transaction status indication may be mapped to, or otherwise associated with, the loyalty program in the transaction status indication library 322. Accordingly, the transaction status indication determination module 312 may determine that the transaction status indication that is mapped to, or otherwise associated with, the loyalty program is the appropriate transaction status indication for the transaction. As such, the transaction status indication determination module 312 may send instructions associated with the transaction status indication to the POS system 200, as described below. For instance, if a response associated with a transaction status indicates that a transaction associated with a customer who is associated with a particular loyalty program is successful, the transaction status indication determination module 312 may access a successful transaction status indication mapped to, or otherwise associated with, the particular loyalty program in the transaction status indication library 322, and may send instructions associated with the successful transaction status indication to the POS system 200.

As another non-limiting example, the transaction status indication determination module 312 may determine, based on customer data, a status level associated with a customer. A status level may correspond to a tier in a program that rewards a customer particular rewards. In at least one example, a status level associated with a top tier may reward a customer with more valuable rewards than a status level associated with a lower (or bottom) tier. Each tier may be associated with a certain number of dollars spent by a customer, referrals made by a customer, points earned by the customer, etc. In some examples, different transaction status indications may be mapped to, or otherwise associated with, different status levels in the transaction status indication library 322. In at least one example, a transaction status indication may be mapped to, or otherwise associated with, the status level in the transaction status indication library 322. Accordingly, the transaction status indication determination module 312 may determine that the transaction status indication that is mapped to, or otherwise associated with, the status level is the appropriate transaction status indication for the transaction. As such, the transaction status indication determination module 312 may send instructions associated with the transaction status indication to the POS system 200, as described below. For instance, if a response associated with a transaction status indicates that a transaction associated with a customer who is associated with a particular status level is successful, the transaction status indication determination module 312 may access a successful transaction status indication mapped to, or otherwise associated with, the particular status level in the transaction status indication library 322, and may send instructions associated with the successful transaction status indication to the POS system 200.

In at least one example, more than one transaction status indication may be associated with a transaction. For instance, a first transaction status indication associated with a status level of a customer and a second transaction status indication associated with a total spend may be determined to be appropriate for a particular transaction. In such an example, the transaction status indication determination module 312 may implement a prioritization policy to determine which transaction status indication is to be presented to communicate the status of the transaction to the merchant and/or customer. In some examples, the prioritization policy may prioritize customer preferences over merchant preferences. That is, in such examples, customer specified transaction status indications may be prioritized over merchant specified transaction indications. In other examples, the prioritization policy may prioritize merchant preferences over customer preferences. That is, in such examples, merchant specified transaction status indications may be prioritized over customer specified transaction indications. Additional and/or alternative prioritizations may be used to determine which transaction status indication is to be presented for a particular transaction.

Block 510 illustrates sending instructions associated with the transaction status indication to a POS application executing on a POS terminal of the POS system. The transaction status indication determination module 312 may determine transaction status indications and send instructions associated with the transaction status indications to the POS system 200. In some examples, the POS system 200 may include a POS terminal 202 and a payment reader device 204. In at least one example, the transaction status indication determination module 312 may send instructions to the POS terminal 202 and the POS terminal 202 may provide instructions to the payment reader device 204, which may provide instructions to the customer device 400 via a short-range communication network. In an alternate example, instructions associated with the transaction status indication may be provided by the payment server(s) 300 directly to the POS terminal 202 and the customer device 400. Or, in yet another alternate example, instructions associated with the transaction status indication may be provided by the payment server(s) 300 directly to the payment reader device 204 and the customer device 400. Alternatively, instructions associated with the transaction status indication may be provided by the payment server(s) 300 to the POS terminal 202, which may send instructions to the payment reader device 204 and the customer device 400.

As described above, in some examples, the instructions may include data associated with the transaction status indication. For instance, the instructions may include audio data, image data, etc. corresponding to an aspect of the transaction status indication that is to be output by the payment reader device 204 or the customer device. In other examples, the instructions may instruct the POS terminal 202 or customer device 400 to access respective transaction status indication libraries, described above, to access data associated with the respective aspects of the transaction status indication. That is, the respective audio data, image data, etc. may be stored in a transaction status indication library local to the POS terminal 202 and/or the customer device 400 and the POS terminal 202 and/or the customer device 400 may access the audio data, image data, etc. based on instructions received from the transaction status indication determination module 312. For instance, in at least one example, the instructions may instruct the POS terminal 202 to access audio data, image data, etc. corresponding to a successful transaction indication that is stored in the local transaction status indication library.

FIG. 6 depicts a non-limiting flow diagram illustrating a method 600 for receiving instructions for outputting respective aspects of a transaction status indication via a payment reader device and a customer device.

Block 602 illustrates receiving, via a payment reader device and in association with a transaction between a customer and a merchant, payment data from a payment application executing on a customer device associated with the customer. As described above, a POS system 200 may include a POS terminal 202 and a payment reader device 204. A data collection module 214 stored on the POS terminal 202 may receive, determine, and/or access data associated with transactions (e.g., transaction data) of a merchant of the POS system 200. Transaction data may include payment data, identification data, location data, etc. In at least one example, the data collection module 214 may receive payment data from the payment reader device 204. Payment data may include a name of the customer, an address of the customer, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to the customer (which may or may not match the number associated with the payment instrument), restrictions on what types of charges/debts may be made, etc. In at least one example, the payment reader device 204 may receive payment data for a transaction between a customer and a merchant via a short-range communication network. The payment reader device 204 provide the payment data to the data collection module 214.

Block 604 illustrates sending the payment data to a payment server application. In at least one example, a communication module 216 associated with the POS terminal 200 may send transaction data, including payment data, as described above, to the payment server(s) 300 and the payment server(s) 300 may attempt to authorize the payment data for a cost of the transaction.

Block 606 illustrates receiving, from the payment server application, an indication of a status of the transaction. As described above, the payment server(s) 300 may send indications of statuses of transactions to the communication module 216. That is, the payment server(s) 300 may send an indication signaling whether a transaction is successful (e.g., the payment data is authorized for the cost of the transaction), is unsuccessful (e.g., the payment data is not authorized for the cost of the transaction), requires more information, etc. The communication module 216 may receive the indication as to whether the transaction is successful (e.g., the payment data is authorized for the cost of the transaction), is unsuccessful (e.g., the payment data is not authorized for the cost of the transaction), requires more information, etc.

Block 608 illustrates receiving, from the payment server application, instructions for outputting respective aspects of a transaction status indication via the payment reader device and the customer device. In at least one example, the payment server(s) 300 may send instructions for facilitating a transaction status indication associated with the transaction. The transaction status indication management module 218 associated with the POS system 200 may receive instructions associated with the transaction status indication from the payment server(s) 300. In some examples, the instructions may include data associated with the transaction status indication. That is, the instructions may include audio data, image data, etc. associated with the transaction status indication. In such examples, the transaction status indication management module 218 may send the instructions to the payment reader device 204.

In other examples, the instructions may instruct the transaction status indication management module 218 to access data associated with the transaction status indication that is stored in the transaction status indication library 226 that is local to the POS terminal 202. In such examples, the transaction status indication management module 218 may access the data associated with the transaction status indication in the transaction status indication library 226 and may send the instructions including the data associated with the transaction status indication to the payment reader device 204. For instance, in at least one example, the instructions may instruct the transaction status indication management module 218 to access audio data, image data, etc. corresponding to a successful transaction indication that is stored in the local transaction status indication library 226.

In at least one example, regardless of whether the first instructions are associated with data or instructions for accessing data in the transaction status indication library 226, the transaction status indication management module 218 may send instructions for accessing data associated with a second aspect of the transaction status indication that is to be output via a customer device 400 in a transaction status indication library 418 that is local to the customer device 400. In such examples, the customer device 400 may access data associated with the second aspect of the transaction status indication from a transaction status indication library 418 that is local to the customer device 400. For instance, in at least one example, the instructions may instruct the presentation module 412 to access audio data, image data, etc. corresponding to a successful transaction indication that is stored in the local transaction status indication library 418.

FIG. 7 depicts a non-limiting flow diagram illustrating a method for receiving instructions for outputting respective aspects of a transaction status indication via a payment reader device and a customer device, sending instructions to the customer device, and outputting the respective aspects of the transaction status indication via the payment device and the customer device.

Block 702 illustrates receiving, from a POS terminal, first instructions for outputting a first aspect of a transaction status indication via a payment reader device and second instructions for outputting a second aspect of the transaction status indication via a customer device. As described above, a POS system 200 may include a POS terminal 202 and a payment reader device 204. In at least one example, the POS terminal 202 may send instructions to the payment reader device 204. An execution module 244 stored on the payment reader device 204 may receive instructions associated with a transaction status indication from the POS terminal 202. In some examples, the instructions may include first instructions associated with a first aspect of a transaction status indication that is to be output via the payment reader device 204 and second instructions associated with a second aspect of the transaction status indication that is to be output via a customer device 400. In such examples, the first instructions may include a first time interval, the lapse of which triggers the payment reader device 204 to output the first aspect of the transaction status indication. And, the second instructions may include a second time interval, the lapse of which triggers the customer device to output the second aspect of the transaction status indication.

Block 704 illustrates sending the second instructions to a payment application executing on the customer device. The execution module 244 may receive the instructions from the POS terminal 202, as described above, and may send the second instructions to a customer device 400 via a short-range communication network.

Block 706 illustrates determining a first time interval associated with the first instructions, the lapse of which triggers an output of the first aspect of the transaction status indication via the payment reader device. As described above, in at least one example, the first instructions may include a first time interval, the lapse of which triggers the payment reader device 204 to output the first aspect of the transaction status indication. In at least one example, the execution module 244 may determine the first interval based on the first instructions.

Block 708 illustrates determining that a lapse of time is equal to the first time interval. In at least one example, the execution module 244 may receive a timer signal from a timer 236 associated with the payment reader device 204. The timer 236 may track time following the receipt of the first instructions. The execution module 244 may receive a time signal and may determine that a lapse of time following the receipt of the first instructions is equal to the first time interval.

Block 710 illustrates outputting the first aspect of the transaction status indication at a first time. Based at least in part on determining a lapse of time that is equal to the first time interval, the execution module 244 may cause the first aspect of the transaction status indication to be output via input/output interface(s) 238 associated with the payment reader device 204. That is, the execution module 244 may cause the first aspect of the transaction status indication to be output via input/output interface(s) 238 associated with the payment reader device 204 at a first time. In at least one example, the first instructions include data associated with the first aspect of the transaction status indication. That is, the first instructions include audio data, image data, etc. that is to be output at the first time. Accordingly, the execution module 244 may cause the audio data, image data, etc. to be output via input/output interface(s) 238 associated with the payment reader device 204 at the first time.

Block 712 illustrates receiving, from a payment reader device, the second instructions. As described above, the execution module 244 may send the second instructions to the customer device 400. The customer device 400 may be associated with a presentation module 412, which may receive the second instructions from the payment reader device 204. As described above, the second instructions may be associated with a second aspect of the transaction status indication that is to be output via a customer device 400. In at least one example, the second instructions may include a second time interval, the lapse of which triggers the customer device 400 to output the second aspect of the transaction status indication.

Block 714 illustrates determining a second time interval associated with the second instructions, the lapse of which triggers an output of the second aspect of the transaction status indication via the customer device. As described above, in at least one example, the second instructions may include a second time interval, the lapse of which triggers the customer device 400 to output the second aspect of the transaction status indication. In at least one example, the presentation module 412 may determine the second interval based on the second instructions.

Block 716 illustrates determining that a lapse of time is equal to the second time interval. In at least one example, the presentation module 412 may determine that a lapse of time following the receipt of the second instructions is equal to the second time interval.

Block 718 illustrates outputting the second aspect of the transaction status indication at a second time. In at least one example, the second instructions may include data associated with the second aspect of the transaction status indication. That is, the second instructions may include audio data, image data, etc. In such examples, the presentation module 412 may cause the audio data, image data, etc. to be output via the input/output interface(s) 406 at the second time. In other examples, the second instructions may instruct the presentation module 412 to access data associated with the second aspect of the transaction status indication from the transaction status indication library 418. In such examples, the presentation module 412 may access the audio data, image data, etc. corresponding to the second aspect of the transaction status indication that is stored in the transaction status indication library 418 and may cause the audio data, image data, etc. to be output via the input/output interface(s) 406 at the second time.

The first aspect and the second aspect of the transaction status indication may be output synchronously or asynchronously. That is, in some examples, the first time and the second time may be a same time or different times. In at least one example, the first time and the second time may be successive. In other examples, the first time and the second time may substantially overlap. Moreover, in yet additional and/or alternative examples, the first time may be a specified time interval before or after the second time.

In at least one example, a first aspect may be output for a first length of time and the second aspect may be output for a second length of time. In some examples, the first length of time and the second length of time may be the same length of time. In other examples, the first length of time and the second length of time may be different lengths of time.

In at least one example, the first aspect and the second aspect may be associated with audio outputs. In some examples, the first aspect and the second aspect of the transaction status indication may be same sounds. In other examples, the first aspect and the second aspect of the transaction status indication may be different sounds. In some examples, when the first aspect and the second aspect of the transaction status indication are different sounds, the different sounds may be complementary. In at least one example, the first aspect and the second aspect may be output such to generate a harmonious sound. In other examples, the first aspect and the second aspect may be output in a particular order to generate a musical scale (i.e., a set of musical notes ordered by fundamental frequency or pitch). Or, as described above with reference to FIG. 1, the first aspect may be a first word (e.g., "Go!") and the second aspect may be a second word (e.g., "Team!"), that when output successively comprise a phrase (e.g., "Go Team!").

In alternative examples, the first aspect and the second aspect may be associated with visual outputs. For instance, the payment reader device 204 may output a first aspect of a transaction status indicator that is associated with a first color of light and the customer device 400 may output a second aspect of the transaction status indicator that is associated with a second color of light. The first aspect and the second aspect may be a same color. Or, the first aspect and the second aspect may be different colors. In some examples, the first aspect and the second aspect may represent colors of a team, a school, etc. In other examples, the first aspect and the aspect may be blended to create a third color. In yet an additional and/or alternative example, the payment reader device 204 may output a first aspect of a transaction status indicator that is associated with a first set of colors of light and the customer device 400 may output a second aspect of the transaction status indicator that is associated with a second set of colors of light. In some examples, the first aspect may transition into the second aspect. Or, the first aspect and the second aspect may be integrated to generate a rainbow. Additional and/or alternative visual signals may be imagined.

While FIG. 7 refers to first instructions and a second instructions corresponding to a first aspect and a second aspect, in some examples, the first instructions may be associated with more than one aspect and the second instructions may be associated with more than one aspect. In such examples, each aspect may be associated with respective time intervals indicating when the aspect is to be output. A non-limiting example of a transaction signal indication having multiple aspects may be a transaction signal indication where the payment reader device 204 outputs a first sound, the customer device 400 outputs a second sound, the payment reader device 204 outputs a third sound, and the customer device 400 outputs a fourth sound, etc., such that the two devices are playing sounds back and forth.

Furthermore, while FIG. 7 is directed to an example where the transaction status indication determination module 312 may send instructions to the POS terminal 202 and the POS terminal 202 may provide instructions to the payment reader device 204, which may provide instructions to the customer device 400 via a short-range communication network, the instructions may be sent to the payment reader device 204 and/or the customer device 400 from alternative sources. For instance, in an alternate example, instructions associated with the transaction status indication may be provided by the payment server(s) 300 directly to the POS terminal 202 and the customer device 400. Or, in yet another alternate example, instructions associated with the transaction status indication may be provided by the payment server(s) 300 directly to the payment reader device 204 and the customer device 400. Alternatively, instructions associated with the transaction status indication may be provided by the payment server(s) 300 to the POS terminal 202, which may send instructions to the payment reader device 204 and the customer device 400.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A computer-implemented method comprising:
    receiving, at a point-of-sale (POS) application associated with a POS system, payment information for satisfying a cost of a transaction between a customer and a merchant, the payment information received by a payment reader device of the POS system from a device associated with the customer;
    sending, to a server, a request to authorize the payment information for the cost of the transaction;
    receiving, from the server, a response indicating a status of the transaction;
    selecting, by the POS application and from a plurality of transaction status indications, a transaction status indication for the transaction to communicate the status of the transaction to the customer and the merchant, wherein the transaction status indication is selected based at least in part on at least one of customer data associated with the customer, merchant data associated with the merchant, or transaction details associated with the transaction; and
    sending, from the POS application, instructions associated with the transaction status indication to cause the payment reader device to output a first portion of the transaction status indication and the device associated with the customer to output a second portion of the transaction status indication.

2. The computer-implemented method of claim 1, further comprising:
    determining an event associated with the transaction; and
    determining the transaction status indication based at least in part on the event.

3. The computer-implemented method of claim 1, further comprising:
    determining, based at least in part on the transaction details, a location associated with the transaction; and
    determining the transaction status indication based at least in part on the location.

4. The computer-implemented method of claim 1, further comprising:
    determining, based at least in part on the transaction details, a total spend associated with the transaction; and
    determining the transaction status indication based at least in part on the total spend.

5. The computer-implemented method of claim 1, further comprising:
    determining, based at least in part on the transaction details, at least one item acquired via the transaction; and
    determining the transaction status indication based at least in part on the at least one item.

6. The computer-implemented method of claim 1, further comprising:
    determining, based at least in part on the customer data, a status level associated with the customer; and
    determining the transaction status indication based at least in part on the status level.

7. The computer-implemented method of claim 1, further comprising:
    determining, based at least in part on the transaction details, an identity of the merchant; and
    determining the transaction status indication based at least in part on the identity of the merchant.

8. The computer-implemented method of claim 1, further comprising:
    determining, based at least in part on the merchant data, a category associated with the merchant; and
    determining the transaction status indication based at least in part on the category associated with the merchant.

9. The computer-implemented method of claim 1, wherein the transaction status indication is associated with an audio signal.

10. The computer-implemented method of claim 1, wherein the transaction status indication is associated with a visual signal.

11. The computer-implemented method of claim 1, wherein sending instructions associated with the transaction status indication comprises:
    sending first instructions to the POS system to cause the payment reader device to output the first portion of the transaction status indication; and
    sending second instructions to the device associated with the customer to cause the device associated with the customer to output the second portion of the transaction status indication.

12. One or more non-transitory computer-readable media, that when executed by one or more processors associated with a POS terminal, cause the one or more processors to perform operations comprising:
    receiving payment information for satisfying a cost of a transaction between a customer and a merchant, wherein the payment information is received by a payment reader device associated with the POS terminal from a device associated with the customer;
    sending the payment information to a payment server application, the payment server application to attempt to authorize the payment information for the cost of the transaction;
    receiving, from the payment server application, an indication of a status of the transaction;
    based on the indication, retrieving instructions for outputting a transaction status indication that signals the status of the transaction to the customer and the merchant, wherein the transaction status indication is selected, from a plurality of transaction status indications, based at least in part on at least one of customer data associated with the customer, merchant data associated with the merchant, or transaction details associated with the transaction; and sending the instructions associated with the transaction status indication to cause the payment reader device to output a first portion of a transaction status indication and the device associated with the customer to output a second portion of the transaction status indication.

13. The one or more non-transitory computer-readable media of claim 12, wherein the operations further comprise:
first instructions associated with the first portion of the transaction status indication and a first time interval, lapse of which triggers the payment reader device to output the first portion at a first time; and
second instructions associated with the second portion of the transaction status indication and a second time interval, the lapse of which triggers a payment application executing on the device associated with the customer to output the second portion at a second time.

14. The one or more non-transitory computer-readable media of claim 12, wherein the instructions are associated with data corresponding to the respective portions of the transaction status indication.

15. The one or more non-transitory computer-readable media of claim 12, wherein the transaction status indication is associated with at least one of an audio signal or a visual signal.

16. A POS system comprising:
one or more processors;
one or more non-transitory computer-readable media executable by the one or more processors to perform operations comprising:
receiving, at a point-of-sale (POS) application associated with the POS system, payment information for satisfying a cost of a transaction between a customer and a merchant, the payment information received by a payment reader device of the POS system from a device associated with the customer;

sending, to a server, a request to authorize the payment information for the cost of the transaction;
receiving, from the server, a response indicating a status of the transaction;
selecting, by the POS application and from a plurality of transaction status indications, a transaction status indication for the transaction to communicate the status of the transaction to the customer and the merchant, wherein the transaction status indication is selected based at least in part on at least one of customer data associated with the customer, merchant data associated with the merchant, or transaction details associated with the transaction; and
sending, from the POS application, instructions associated with the transaction status indication to cause the payment reader device to output a first portion of the transaction status indication and the device associated with the customer to output a second portion of the transaction status indication.

17. The POS system as claim 16 recites, wherein the first portion is associated with a first sound and the second portion is associated with a second sound and the first sound and the second sound are the same sound, output at the same time.

18. The POS system as claim 16 recites, wherein the first portion is associated with a first sound and the second portion is associated with a second sound and the first sound and the second sound are different sounds, output at the same time.

19. The POS system as claim 16 recites, wherein the first portion is associated with a first sound and the second portion is associated with a second sound and the first sound and the second sound are different sounds, output at different times.

20. The POS system as claim 16 recites, wherein the payment reader device is communicatively coupled to the POS system via Bluetooth®, Bluetooth® low energy, near-field communication, or radio-frequency identification, and the instructions are sent to the payment reader via Bluetooth®, Bluetooth® low energy, near-field communication, or radio-frequency identification.

* * * * *